United States Patent
Stone et al.

(10) Patent No.: US 9,014,836 B2
(45) Date of Patent: Apr. 21, 2015

(54) AUTONOMOUS CARRIER SYSTEM FOR MOVING AIRCRAFT STRUCTURES

(75) Inventors: Paul Reed Stone, Federal Way, WA (US); Clayton Lynn Munk, Maple Valley, WA (US); Eric M. Reid, Kenmore, WA (US)

(73) Assignee: The Boeing Company, Chicago, IL (US)

( * ) Notice: Subject to any disclaimer, the term of this patent is extended or adjusted under 35 U.S.C. 154(b) by 405 days.

(21) Appl. No.: 13/326,996

(22) Filed: Dec. 15, 2011

(65) Prior Publication Data

US 2013/0158697 A1    Jun. 20, 2013

(51) Int. Cl.
  G06F 19/00   (2011.01)
  B65H 1/00   (2006.01)
  B23P 19/00   (2006.01)
  B21D 47/00   (2006.01)
  B21D 53/88   (2006.01)
  B64F 5/00   (2006.01)

(52) U.S. Cl.
  CPC .............. *B64F 5/0036* (2013.01); *B64F 5/0009* (2013.01); *Y10T 29/49616* (2015.01); *Y10T 29/49622* (2015.01); *Y10T 29/534* (2015.01)

(58) Field of Classification Search
  CPC .............................. B64F 5/0009; B64F 5/0036
  USPC ....................... 700/114; 414/222.01
  See application file for complete search history.

(56) References Cited

U.S. PATENT DOCUMENTS

| | | | |
|---|---|---|---|
| 5,131,728 A | 7/1992 | Katoh et al. | |
| 5,363,935 A * | 11/1994 | Schempf et al. | ................ 180/9.1 |
| 5,435,405 A | 7/1995 | Schempf et al. | |
| 5,894,901 A | 4/1999 | Awamura et al. | |
| 6,546,616 B2 | 4/2003 | Radowick | |
| 6,779,272 B2 | 8/2004 | Day et al. | |
| 6,808,143 B2 | 10/2004 | Munk et al. | |
| 6,979,288 B2 * | 12/2005 | Hazlehurst et al. | ................ 483/1 |
| 7,319,738 B2 * | 1/2008 | Lasiuk et al. | ................... 378/59 |
| 7,461,711 B2 | 12/2008 | McCrary et al. | |
| 7,747,349 B2 | 6/2010 | Yeh et al. | |
| 7,917,242 B2 | 3/2011 | Jones | |
| 8,005,563 B2 | 8/2011 | Cobb et al. | |
| 2005/0044700 A1 * | 3/2005 | Ghuman et al. | ................ 29/791 |
| 2005/0116105 A1 * | 6/2005 | Munk et al. | .................... 244/123 |
| 2005/0223837 A1 * | 10/2005 | van der Meulen | ......... 74/490.01 |
| 2006/0005735 A1 | 1/2006 | Lopatinsky et al. | |
| 2009/0123264 A1 * | 5/2009 | Hartmann et al. | ......... 414/798.2 |
| 2010/0217437 A1 * | 8/2010 | Sarh et al. | ...................... 700/248 |
| 2011/0000082 A1 * | 1/2011 | Yamashita et al. | .............. 29/791 |
| 2011/0054694 A1 | 3/2011 | Munk | |
| 2012/0216384 A1 * | 8/2012 | Immekus | ........................ 29/428 |

* cited by examiner

*Primary Examiner* — Mohammad Ali
*Assistant Examiner* — Yuhui R Pan
(74) *Attorney, Agent, or Firm* — Yee & Associates, P.C.

(57) ABSTRACT

A method and apparatus for manufacturing a structure. A part for the structure may be supported on a plurality of mobile fixtures configured to control an orientation of the part. The part for the structure may be moved using the plurality of mobile fixtures to a number of stations for performing a number of operations for manufacturing the structure using the part. The plurality of mobile fixtures may be configured to move in a coordinated manner and substantially maintain a desired orientation for the part while moving the part to a station in the number of stations. The number of operations for manufacturing the structure may be performed at the number of stations while the plurality of mobile fixtures supports the part.

33 Claims, 30 Drawing Sheets

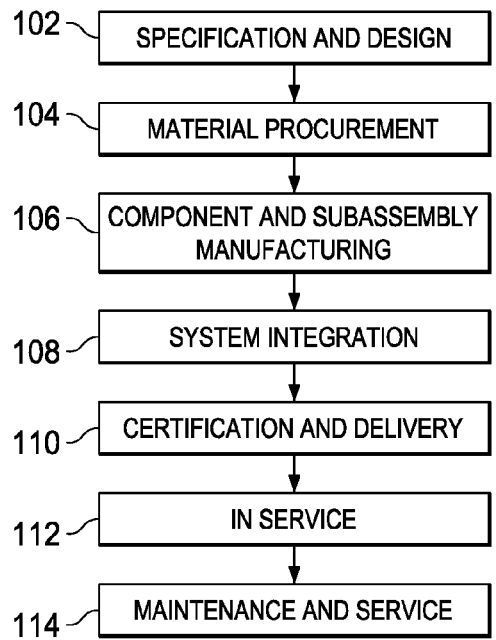
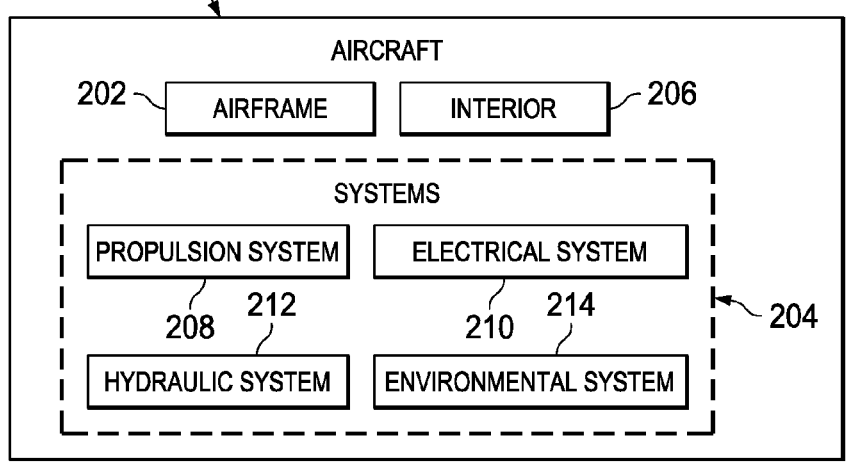

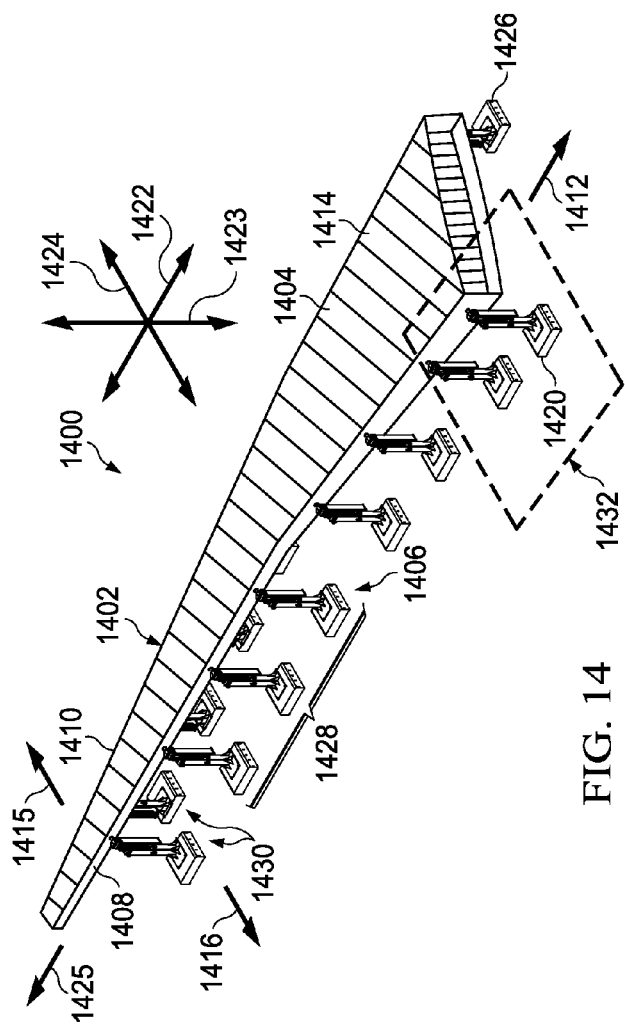
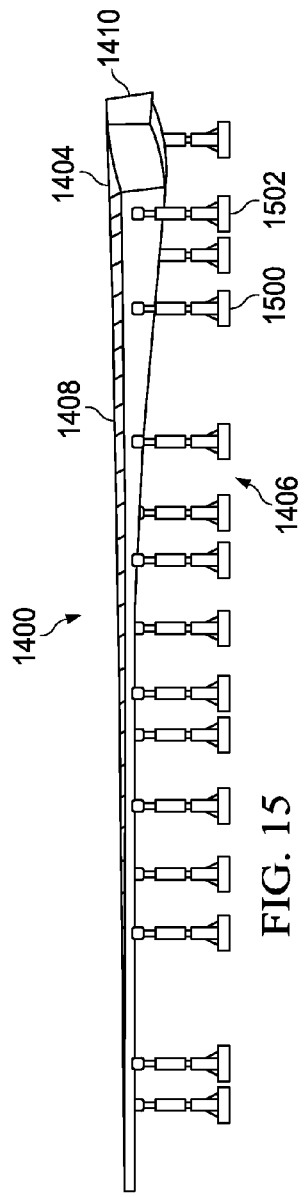
FIG. 14
FIG. 15

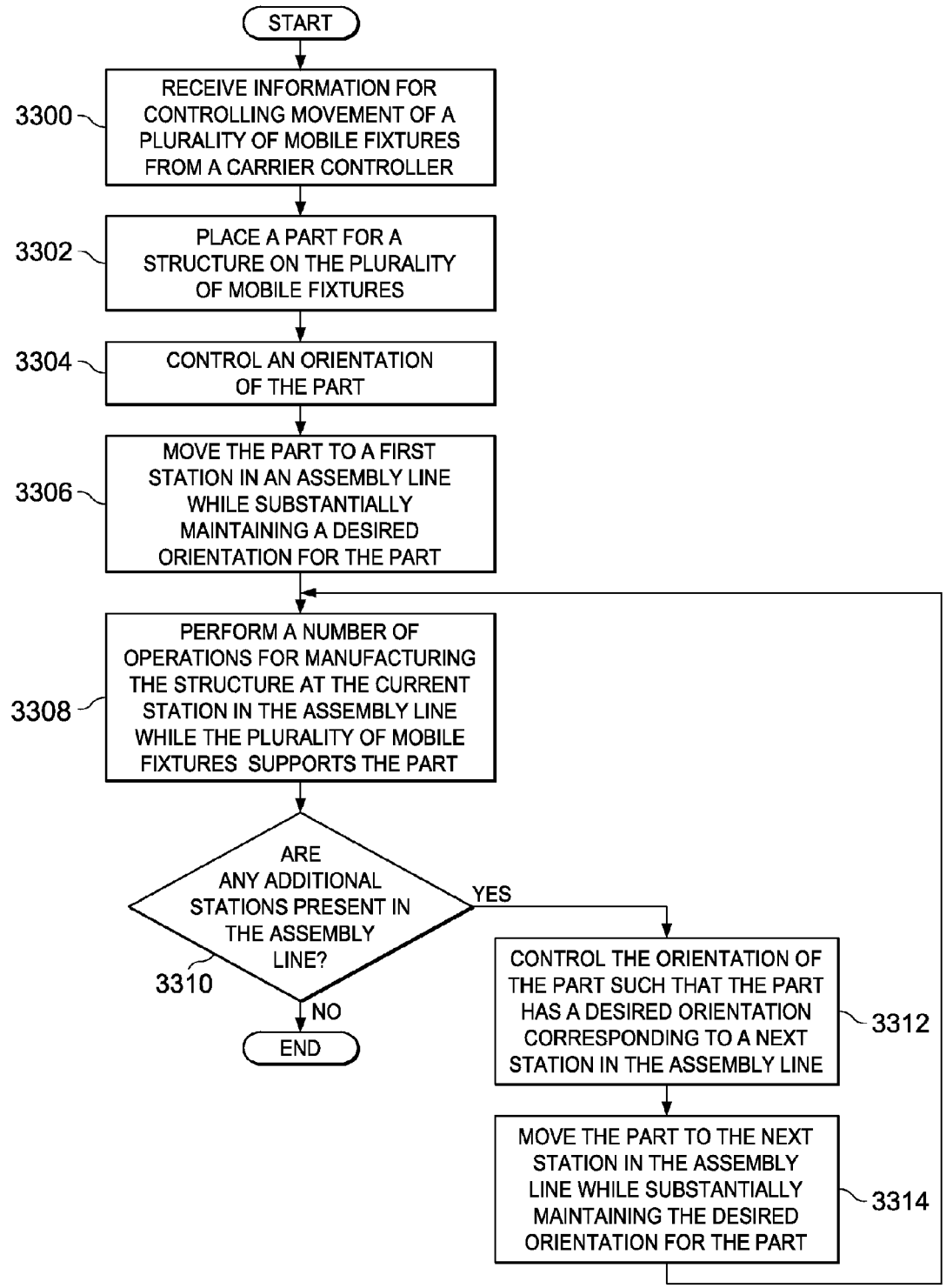

AUTONOMOUS CARRIER SYSTEM FOR MOVING AIRCRAFT STRUCTURES

BACKGROUND INFORMATION

1. Field

The present disclosure relates generally to manufacturing aircraft structures using assembly lines and, in particular, to a method and apparatus for manufacturing wings, flight control surfaces, and other types of aircraft structures using mobile fixtures that support and transport parts for manufacturing these aircraft structures.

2. Background

With currently available assembly lines, transportation of the components used to manufacture aircraft structures, such as a wing, may be more difficult than desired. For example, a wing for an aircraft may have a wedge shape. In other words, the wing may be wide at an inboard end of the wing and narrow at an outboard end of the wing. This type of shape may make manufacturing the wing more difficult and time-consuming than desired.

Some currently available methods for manufacturing a wing, as well as other types of aircraft structures, may use a fixed assembly system. A fixed assembly system may use a number of stationary support fixtures to support a wing box and/or other parts for the wing at different positions or stations along an assembly line and may use a separate transportation system to transport the wing box and/or other parts for the wing to the different stations along the assembly line.

For example, moving a wing box from one station to another station and positioning that wing box on a stationary support fixture in a desired orientation may take from about 30 minutes to about several hours with some currently available support fixtures and transportation equipment. This time may increase the overall manufacturing time more than desired.

Additionally, with some currently available fixed assembly systems, the transportation equipment used to transport a wing box may be unable to pass between the stationary support fixtures supporting the wing box at the narrow end of the wing box. Further, in some cases, the transportation equipment may be unable to pass between the stationary support fixtures supporting the wing box when the wing box is held in certain orientations. Coupling and uncoupling the wing box and/or other parts for manufacturing the wing to and from the stationary support fixtures used in a fixed assembly system and then coupling and uncoupling the wing box and/or other parts to and from the transportation equipment used in the fixed assembly system may increase the time and/or effort needed to manufacture the wing more than desired.

Other currently available methods for manufacturing a wing may use long cantilevered structures or removable cantilevered structures on stationary support fixtures. However, cantilevered structures may be subject to deflection and, consequently, may be unable to locate a wing box to be supported within a desired level of accuracy.

Further, removable support fixtures also may have issues with accuracy with respect to removing and relocating the wing box. Removing and relocating the wing box and/or other parts for the wing may create opportunities for debris to get between the removable support fixtures and mating parts for these components.

Additionally, the performance of a wing may be reduced if the location and/or orientation of the wing during manufacturing moves beyond selected tolerances at and/or between any stations along an assembly line. In some cases, the interchangeability of parts on a wing may be reduced when the wing is not supported in a desired orientation within selected tolerances while being transported and/or during manufacturing.

Therefore, it would be desirable to have a method and apparatus that takes into account one or more of the issues discussed above as well as possibly other issues.

SUMMARY

In one illustrative embodiment, a method for manufacturing a structure may be present. A part for the structure may be supported on a plurality of mobile fixtures configured to control an orientation of the part. The part for the structure may be moved using the plurality of mobile fixtures to a number of stations for performing a number of operations for manufacturing the structure using the part. The plurality of mobile fixtures may be configured to move in a coordinated manner and substantially maintain a desired orientation for the part while moving the part to a station in the number of stations. The number of operations for manufacturing the structure may be performed at the number of stations while the plurality of mobile fixtures supports the part.

In another illustrative embodiment, an apparatus may comprise a number of stations and a plurality of mobile fixtures. The number of stations may perform a number of operations for manufacturing a structure. The plurality of mobile fixtures may be configured to support a part for the structure. The plurality of mobile fixtures may be further configured to control an orientation of the part. The plurality of mobile fixtures may be further configured to move the part to a station in the number of stations while substantially maintaining a desired orientation for the part. The plurality of mobile fixtures may be configured to move in a coordinated manner.

In yet another illustrative embodiment, a mobile fixture may comprise a motorized base, a support system, and a controller. The motorized base may be configured to move on a surface. The support system may be associated with the motorized base. The support system may be configured to be positioned to support a portion of a structure. The controller may be associated with the motorized base. The controller may be configured to control movement of the motorized base.

In yet another illustrative embodiment, a method for manufacturing a structure for an aerospace vehicle is present. A part for the structure may be supported on a plurality of mobile fixtures configured to control an orientation of the part with respect to an x-axis, a y-axis, and a z-axis. Information may be received at controllers in the plurality of mobile fixtures from a carrier controller in communication with the controllers. The carrier controller may be configured to control movement of the plurality of mobile fixtures in a coordinated manner.

The part for the structure may be moved using the plurality of mobile fixtures to a number of stations for performing a number of operations for manufacturing the structure using the part. The plurality of mobile fixtures may be configured to move and substantially maintain a desired orientation for the part while moving the part to a station in the number of stations. The number of stations may be part of an assembly line for manufacturing the structure. At least one of the number of operations for manufacturing the structure may be performed at the station in the number of stations using a group of tools while the plurality of mobile fixtures supports the part.

In yet another illustrative embodiment, a carrier system for an aircraft structure may comprise a plurality of mobile fixtures and a carrier controller. The plurality of mobile fixtures may be configured to hold and move the aircraft structure. A mobile fixture in the plurality of mobile fixtures may comprise a motorized base configured to move on a surface. The mobile fixture may further comprise a support system associated with the motorized base. The support system may be configured to be positioned to support a portion of a structure.

The support system may comprise a post extending from the motorized base. The support system may further comprise a connector system configured to be connected to the structure. The support system may further comprise a member movably connected to the post and connected to the connector system. The member may be configured to move the connector system relative to the motorized base and change a height of the connector system relative to the motorized base.

The mobile fixture may further comprise a controller associated with the motorized base. The controller may be configured to control movement of the motorized base and the plurality of mobile fixtures on the surface. The mobile fixture may further comprise a movement system configured to move the member relative to the connector system. The connector system may comprise a connector configured to be connected to the portion of the structure. The connector system may further comprise a positioning system configured to position the connector about a number of axes. The motorized base may have a housing and the movement system.

The movement system may comprise magnetic tracks and a motor configured to move the magnetic tracks. The carrier controller may be configured to communicate with controllers in the plurality of mobile fixtures. The carrier controller may be further configured to control movement of the plurality of fixtures. The carrier controller may be further configured to control the plurality of mobile fixtures to maintain the structure in a desired orientation.

The features and functions may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

FIG. 1 is an illustration of an aircraft manufacturing and service method in accordance with an illustrative embodiment;

FIG. 2 is illustration of an aircraft in which an illustrative embodiment may be implemented;

FIG. 14 is an illustration of a carrier system in accordance with an illustrative embodiment;

FIG. 15 is an illustration of a side view of a carrier system with a wing in accordance with an illustrative embodiment;

FIG. 33 is an illustration of a process for manufacturing a structure in the form of a flowchart in accordance with an illustrative embodiment.

DETAILED DESCRIPTION

Figure 3:
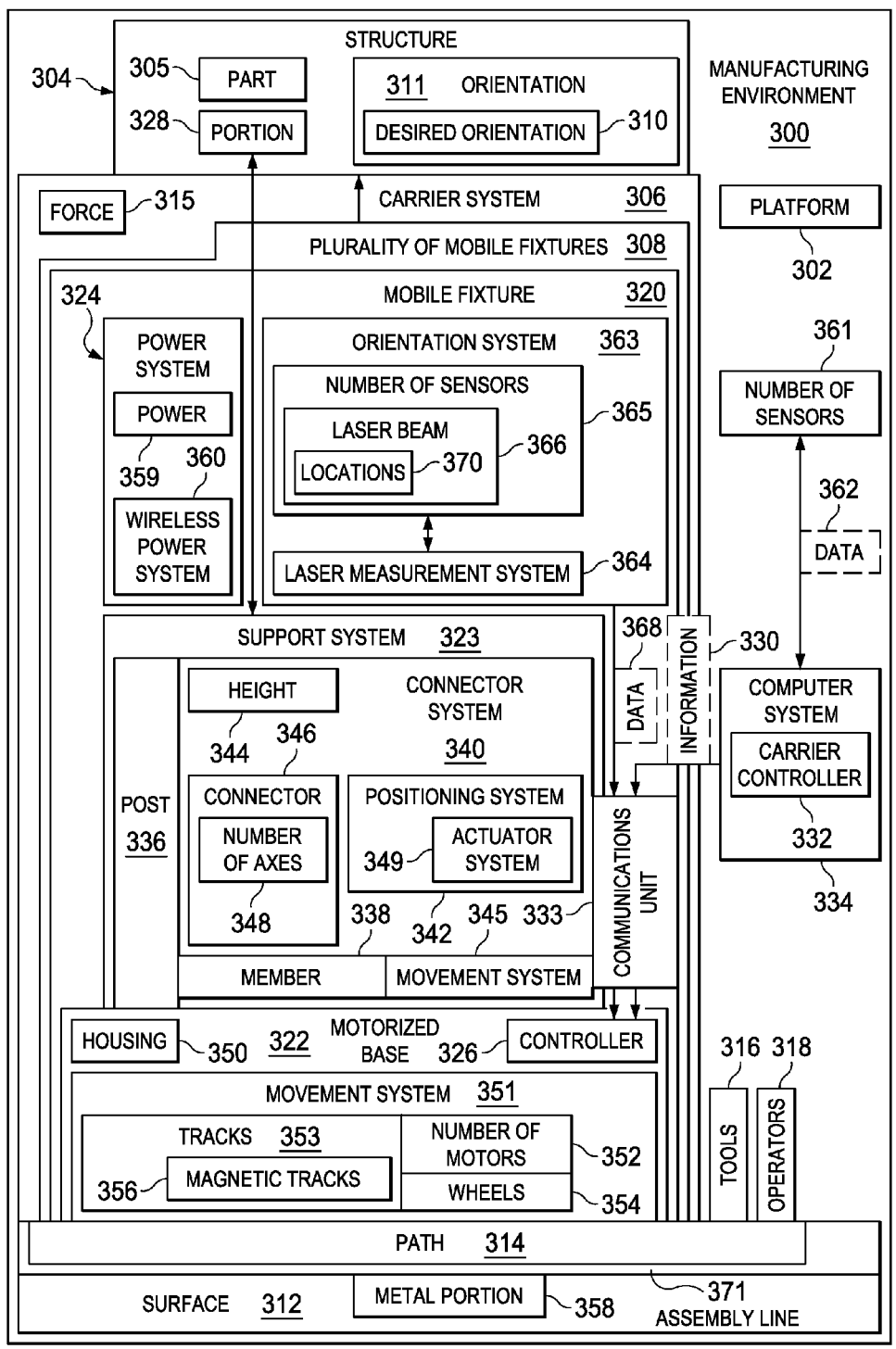
FIG. 3 is an illustration of a manufacturing environment in accordance with an illustrative embodiment.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an illustrative embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 may take place. Thereafter, aircraft 200 may go through certification and delivery 110 in order to be placed in service 112. While in service 112 by a customer, aircraft 200 in FIG. 2 may be scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 2, an illustration of an aircraft is depicted in which an illustrative embodiment may be implemented. In this example, aircraft 200 may be produced by aircraft manufacturing and service method 100 in FIG. 1 and may include airframe 202 with plurality of systems 204 and interior 206. Examples of systems 204 may include one or more of propulsion system 208, electrical system 210, hydraulic system 212, and environmental system 214. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. A number of apparatus embodiments, method embodiments, or a combination thereof may be utilized during production stages, such as component and subassembly manufacturing 106 and system integration 108 in FIG. 1.

A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1.

In particular, different structures manufactured and assembled during one or more stages of aircraft manufacturing and service method 100 may be performed using one or more illustrative embodiments to move the structures. In particular, one or more illustrative embodiments may reduce the amount of time needed to move structures to different locations. The use of a number of the different illustrative embodiments may substantially expedite the assembly of and/or reduce the cost of aircraft 200.

The different illustrative embodiments recognize and take into account that when a structure is manufactured, the structure may be positioned in a desired orientation. This desired orientation may be substantially maintained during manufacturing of the structure using one or more illustrative embodiments. By maintaining the desired orientation, the structure may be manufactured within desired tolerances. As a result, a desired amount of performance or level of maintenance may be achieved.

Further, the different illustrative embodiments also recognize and take into account that if a wing is manufactured at a station and the orientation changes beyond some desired amount, the different features of the wing may not have the desired tolerances. When one or more features of a wing are out of tolerance, the performance and/or maintenance of the wing may be affected.

The different illustrative embodiments recognize and take into account that reducing the time needed to perform different operations on a wing at different stations may reduce the amount of time needed to manufacture the wing. For example, avoiding using a crane or other lifting mechanism to move a structure from a fixture to a platform for transport to another station may be desirable.

The different illustrative embodiments recognize and take into account that with the size of aircraft structures and the desired tolerances of these structures, movement of tools on wheels or rails may be impractical or expensive. Further, the different illustrative embodiments recognize and take into account that as the size of the aircraft structure increases, the size of the platform used to move the aircraft structure down an assembly line also increases.

In other words, maintaining the aircraft structure in a desired orientation as the aircraft structure is moved down an assembly line may depend on the use of platforms that increase in size as the aircraft structure increases in size. These platforms may be constructed with a size and stiffness selected to maintain the aircraft structure in a desired orientation.

The different illustrative embodiments recognize and take into account that although this type of platform may maintain the aircraft structure in the desired orientation, these platforms may have a greater size and expense than desired. Further, the different illustrative embodiments recognize and take into account that the size of the platform may be impractical with the location of tools used to perform operations on the structure.

Thus, the different illustrative embodiments provide a method and apparatus for manufacturing structures. In one illustrative embodiment, an apparatus may comprise a motorized base, a support system, and a controller. The motorized base may be configured to move on a surface. The support system may be associated with the motorized base. The support system may be configured to be positioned to support a portion of the structure. The controller may be associated with the motorized base. The controller may be configured to control movement of the motorized base.

These components may form a mobile fixture. A plurality of mobile fixtures may be connected to the structure and/or a part for use in manufacturing the structure. The structure and/or part may be moved from one station to another station, through an assembly line, and/or some other manufacturing setup.

For example, in one illustrative embodiment, a method for manufacturing a structure may be present. A part for the structure may be supported on a plurality of mobile fixtures configured to control an orientation of the part. The part for the structure may be moved using the plurality of mobile fixtures to a number of stations for performing a number of operations for manufacturing the structure using the part. The plurality of mobile fixtures may be configured to move in a coordinated manner and substantially maintain a desired orientation for the part while moving the part to a station in the number of stations. The number of operations for manufacturing the structure may be performed at the number of stations while the plurality of mobile fixtures supports the part.

Turning next to FIG. 3, an illustration of a manufacturing environment is depicted in accordance with an illustrative embodiment. In this depicted example, manufacturing environment 300 may be employed to manufacture platform 302. In particular, manufacturing environment 300 may be used to manufacture structure 304 for platform 302.

In these illustrative examples, platform 302 may be, for example, without limitation, aircraft 200 in FIG. 2. Structure 304 may be, for example, without limitation, an aerospace structure, a wing, a fuselage, a horizontal stabilizer, a vertical stabilizer, a flight control surface, an engine, or some other suitable type of structure for platform 302. In some cases, structure 304 may be airframe 202, one of plurality of systems 204, or interior 206 in FIG. 2. Further, structure 304 also may be a subassembly for yet another structure.

In this illustrative example, structure 304 may be manufactured using carrier system 306. In these illustrative examples, carrier system 306 may comprise plurality of mobile fixtures 308. Plurality of mobile fixtures 308 may be configured to move in a coordinated manner. In other words, plurality of mobile fixtures 308 may move as a group to move structure 304 and/or parts used to manufacture structure 304. Also, plurality of mobile fixtures 308 may be configured to control orientation 311 of structure 304 and/or parts used to manufacture structure 304 during manufacturing of structure 304. In particular, plurality of mobile fixtures 308 may control orientation 311 of structure 304 such that desired orientation 310 for structure 304 may be substantially maintained.

The manufacturing of structure 304 may involve a number of different operations. For example, without limitation, the operations may include positioning parts, drilling holes, installing fasteners, finishing surfaces, painting surfaces, assembly operations, fabrication operations, and other suitable operations in addition to or in place of the ones listed.

In this illustrative example, plurality of mobile fixtures 308 in carrier system 306 may move structure 304 over surface 312 in manufacturing environment 300. Movement of plurality of mobile fixtures 308 may be along path 314 in manufacturing environment 300. Plurality of mobile fixtures 308 in path 314 may move structure 304 by applying force 315 to structure 304. Force 315 may be applied by some or all of plurality of mobile fixtures 308.

In this illustrative example, tools 316 may be located on path 314 and/or in areas surrounding or near path 314. Tools 316 may perform operations to assemble structure 304 while structure 304 is in desired orientation 310 on plurality of mobile fixtures 308. For example, without limitation, plurality of mobile fixtures 308 may move structure 304 to a particular position along path 314. A portion of tools 316 then may be moved to this particular position along path 314 to perform operations on structure 304. In another example, plurality of mobile fixtures 308 may move structure 304 to a position along path 314 at which tools 316 are located such that tools 316 may perform operations on structure 304.

Additionally, operators 318 also may be present in manufacturing environment 300. Operators 318 may perform operations to assemble structure 304 when structure 304 is positioned along path 314 by plurality of mobile fixtures 308. Operators 318 may be human operators in these illustrative examples. Of course, in other illustrative examples, operators 318 may be robotic operators, robotic machines, or some other type of automated machine configured to perform operations to assemble structure 304.

In this illustrative example, mobile fixture 320 in plurality of mobile fixtures 308 may comprise motorized base 322, support system 323, power system 324, and controller 326. Motorized base 322 is configured to move on surface 312. Motorized base 322 may move without the need for operators 318 or some other external source to move motorized base 322.

Support system 323 may be configured to support portion 328 of structure 304. In particular, support system 323 may be configured to hold portion 328 of structure 304 in desired orientation 310. Controller 326 may be configured to control operation of mobile fixture 320. For example, controller 326 may control movement of motorized base 322 on surface 312 to follow path 314. As another example, controller 326 may control support system 323 to position portion 328 of structure 304 in desired orientation 310.

In this illustrative example, controller 326 in mobile fixture 320 may receive information 330 from carrier controller 332 through communications unit 333. Communications unit 333 may include at least one of a wireless communication unit, a wired communications unit, an optical communications unit, or some other suitable type of communications unit in this illustrative example. As depicted, information 330 may include commands, software, data, and other suitable types of information.

Carrier controller 332 may be implemented using hardware, software, or a combination of the two. Carrier controller 332 may be implemented within computer system 334. Computer system 334 may be one or more computers. When more than one computer is present in computer system 334, those computers may be in communication with each other. This communication may be performed using a medium, such as a network.

Information 330 may be used to direct movement of plurality of mobile fixtures 308 in carrier system 306. For example, information 330 may be used to cause plurality of mobile fixtures 308 to move along path 314. Additionally, information 330 may be used to control orientation 311 of structure 304.

In this illustrative example, support system 323 in mobile fixture 320 may comprise post 336, member 338, connector system 340, and positioning system 342. In this illustrative example, post 336 may extend from motorized base 322. Connector system 340 may be configured to be connected to structure 304. In particular, connector system 340 may be configured to be connected to portion 328 of structure 304. Member 338 may be moveably connected to post 336. Further, member 338 may be connected to connector system 340.

In these illustrative examples, movement of member 338 may move connector system 340 relative to at least one of motorized base 322 and post 336. Movement of member 338 may change height 344 of connector system 340 relative to motorized base 322.

Movement system 345 may be configured to move member 338 relative to post 336. Movement system 345 may take a number of different forms. For example, movement system 345 may be implemented using at least one of a screw jack, an actuator, an electric actuator, a gear system, and other suitable types of movement systems.

As depicted, connector system 340 may comprise connector 346 and positioning system 342. Connector 346 may be configured to be connected to portion 328 of structure 304. Positioning system 342 may be configured to position connector 346 about number of axes 348. In some illustrative examples, positioning system 342 may be operated by operators 318, actuator system 349, or a combination of the two. In other illustrative examples, positioning system 342 may be an automated positioning system.

In this illustrative example, motorized base 322 may comprise housing 350 and movement system 351. As depicted, movement system 351 may include number of motors 352, tracks 353, wheels 354, and other suitable components.

Housing 350 may be associated with other components in mobile fixture 320. For example, without limitation, support system 323 and controller 326 may be associated with housing 350. Tracks 353 and/or wheels 354 may be configured to move motorized base 322 on surface 312 in conjunction with number of motors 352.

In other words, number of motors 352 may operate to cause tracks 353 and/or wheels 354 to move. In these illustrative examples, tracks 353 may take the form of magnetic tracks 356. Magnetic tracks 356 may provide additional traction or support on metal portion 358 of surface 312.

Power system 324 may be configured to provide power 359 to mobile fixture 320. For example, power 359 may be used to operate number of motors 352, controller 326, movement system 351, and other suitable components in mobile fixture 320. Power system 324 may be wireless power system 360. Wireless power system 360 may be at least one of a battery system, an inductive power system, a laser power system, and some other suitable type of wireless power system. Of course, in other illustrative examples, power system 324 may be a wired power system.

In some illustrative examples, number of sensors 361 may be present within manufacturing environment 300. Number of sensors 361 may generate data 362 about at least one of carrier system 306, structure 304, and other suitable objects that may be present in manufacturing environment 300. Data 362 may be used by carrier controller 332 to control orientation 311 for structure 304. Based on data 362, carrier controller 332 may send information 330 for controlling orientation 311 of structure 304 and/or maintaining desired orientation 310.

Data 362 also may be used to guide plurality of mobile fixtures 308 along path 314. Further, data 362 also may be used to identify a change to path 314. For example, obstacles in path 314 identified in data 362 may require changes to path 314. These changes may be placed in information 330 and sent to controller 326 for mobile fixture 320, as well as controllers for other mobile fixtures in plurality of mobile fixtures 308.

Number of sensors 361 may take a number of different forms. For example, without limitation, number of sensors 361 may include at least one of a visible light camera, an infrared camera, a laser measurement tool, an ultrasonic sensor, a pressure sensor, a motion detector, a gyroscope, and other suitable types of sensors that may be located within manufacturing environment 300.

In yet other illustrative examples, orientation 311 may be controlled by plurality of mobile fixtures 308 without assistance from carrier controller 332. For example, without limitation, mobile fixture 320 may also include orientation system 363. Orientation system 363 may be used by mobile fixture 320 to control orientation 311 and maintain desired orientation 310 for portion 328 of structure 304. Collectively, desired orientation 310 for structure 304 may be maintained by plurality of mobile fixtures 308 with orientation system 363.

As illustrated, orientation system 363 may include laser measurement system 364 and number of sensors 365. Laser measurement system 364 may illuminate number of sensors 365 using laser beam 366 to generate data 368 for use by controller 326 to maintain portion 328 of structure 304 in desired orientation 310.

Number of sensors 365 may be located in locations 370 in manufacturing environment 300. For example, number of sensors 365 may be located on mobile fixture 320, other mobile fixtures in plurality of mobile fixtures 308, on structure 304, on tools 316, on operators 318, and on other locations in manufacturing environment 300. In this manner, plurality of mobile fixtures 308 may interact or cooperate with each other to maintain structure 304 in desired orientation 310.

Data 368 may be used to maintain desired orientation 310. Further, data 368 also may be used to control movement of plurality of mobile fixtures 308 in carrier system 306 in manufacturing environment 300. This movement may be along path 314 or adjustments based on obstacles that may be identified.

In these illustrative examples, structure 304 may be manufactured using a number of parts. As one illustrative example, structure 304 may be manufactured using part 305. For example, without limitation, structure 304 may be a wing and part 305 may be a wing box. Depending on the implementation, part 305 may be a frame for structure 304, a housing for structure 304, a number of components previously assembled for structure 304, structure 304 itself, and/or some other type of part for structure 304.

Plurality of mobile fixtures 308 may be configured to support part 305 and move part 305 to a number of different stations along assembly line 371 for manufacturing structure 304. In one illustrative example, path 314 may be a path for assembly line 371.

As used herein, a station along assembly line 371 may be any location along path 314. A station may be a location at which a group of tools may be present for performing operations for manufacturing structure 304. In some cases, a station in assembly line 371 may be a location to which a group of tools are moved to perform the operations for manufacturing structure 304.

Plurality of mobile fixtures 308 may be configured to support and move part 305 in a coordinated manner along path 314 for assembly line 371 to different stations along assembly line 371. Tools 316 may be used to perform operations for manufacturing structure 304 using part 305. Plurality of mobile fixtures 308 may control orientation 311 of part 305 such that orientation 311 of part 305 may be changed at different stations along assembly line 371. Further, plurality of mobile fixtures 308 may substantially maintain desired orientation 310 for part 305 while moving part 305 from one station to another station in assembly line 371.

The illustration of manufacturing environment 300 in FIG. 3 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, plurality of mobile fixtures 308 in carrier system 306 may be all of the same type or different types of mobile fixtures. For example, without limitation, plurality of mobile fixtures 308 may be heterogeneous mobile fixtures or homogeneous mobile fixtures, depending on the particular implementation. For example, when different types of mobile fixtures are used in plurality of mobile fixtures 308, those mobile fixtures may have different dimensions or sizes. As another example, some mobile fixtures in plurality of mobile fixtures 308 may have larger support systems than others.

As another illustrative example, mobile fixtures in plurality of mobile fixtures 308 may cooperate with each other to move structure 304. In other words, information 330 from carrier controller 332 may be optional. In other words, functions performed by carrier controller 332 may be integrated with different controllers in plurality of mobile fixtures 308.

Also, depending on the particular implementation, controller 326 in mobile fixture 320 may run software. This software may have different amounts of functionality and/or intelligence. For example, the software may be a neuro-network, an expert system, an artificial intelligence system, or some other suitable type of program. In other illustrative examples, controller 326 may be hardware configured to perform operations in response to commands in information 330.

Although an illustrative embodiment has been described with respect to aircraft, the illustrative embodiments may be applied to other types of platforms. For example, without limitation, other illustrative embodiments may be applied to a mobile platform, a stationary platform, a land-based structure, an aquatic-based structure, a space-based structure, or some other suitable platform. More specifically, the different illustrative embodiments may be applied to, for example, without limitation, a submarine, a bus, a personnel carrier, a tank, a train, an automobile, a spacecraft, a space station, a satellite, a surface ship, a power plant, a dam, a manufacturing facility, a building, and/or some other suitable platform.

Figure 4:
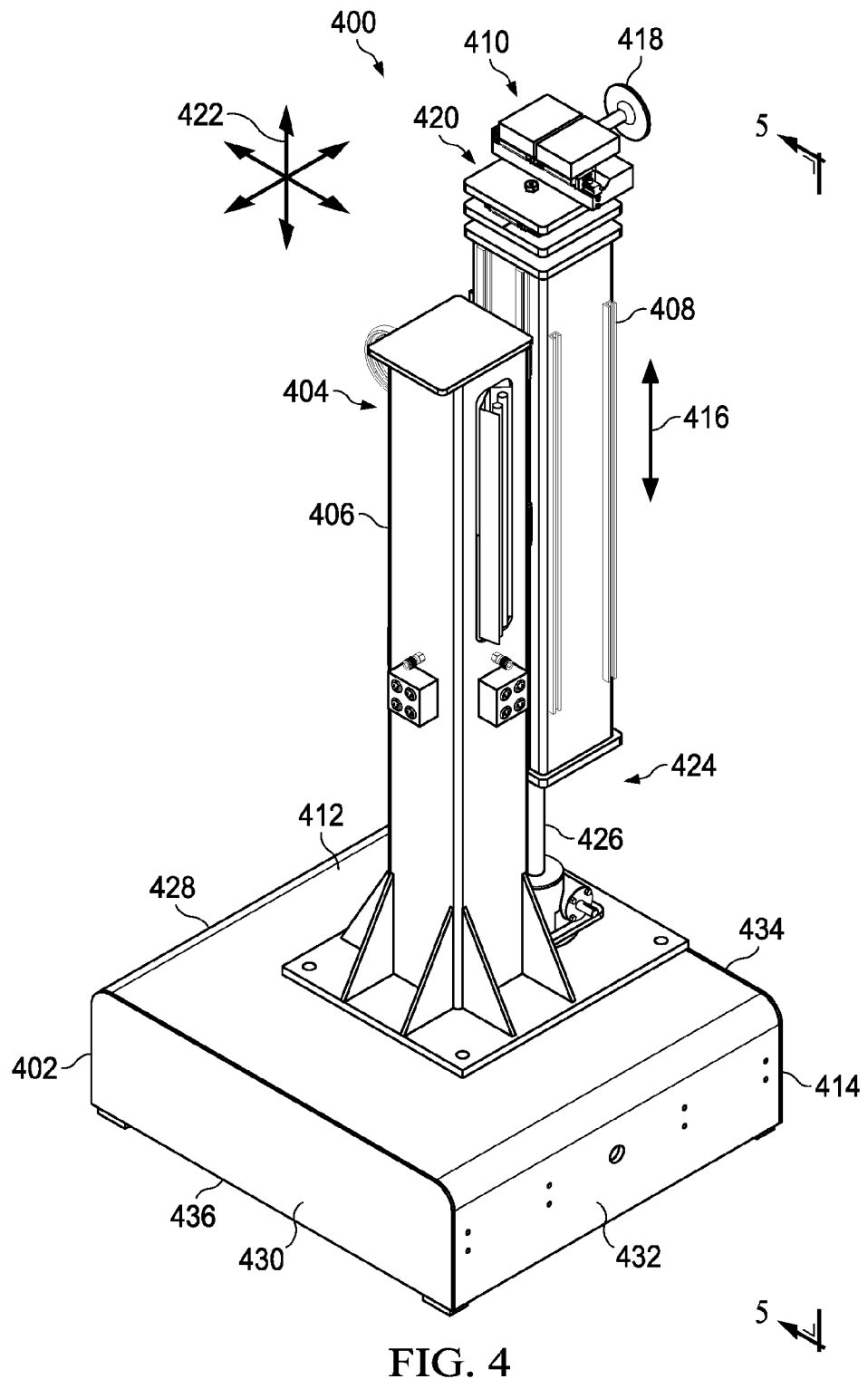
FIG. 4 is an illustration of an isometric view of a mobile fixture in accordance with an illustrative embodiment.

Turning next to FIG. 4, an illustration of an isometric view of a mobile fixture is depicted in accordance with an illustrative embodiment. Mobile fixture 400 is an example of one implementation for mobile fixture 320 in FIG. 3. As depicted in this isometric view, mobile fixture 400 may include motorized base 402 and support system 404.

In this illustrative example, support system 404 may comprise post 406, member 408, and connector system 410. Post 406 may extend from motorized base 402. In particular, post 406 may extend from surface 412 of motorized base 402. Post 406 may be substantially perpendicular to surface 412 on housing 414 of motorized base 402.

In this illustrative example, member 408 may move relative to post 406 in the direction of arrow 416. Further, connector system 410 may comprise connector 418 and positioning system 420. Positioning system 420 may allow connector 418 to move about axes 422 in this illustrative example.

Additionally, mobile fixture 400 also may include movement system 424. As depicted, movement system 424 may be configured to move member 408 relative to post 406. In this illustrative example, movement system 424 may take the form of screw jack 426.

In this illustrative example, motorized base 402 may be substantially square in shape and may have side 428, side 430, side 432, and side 434. Further, motorized base 402 may have bottom 436. Of course, motorized base 402 may have other shapes, such as a circular shape, a rectangular shape, a triangular shape, a cylindrical shape, a cuboidal shape, and other suitable shapes.

Figure 5:
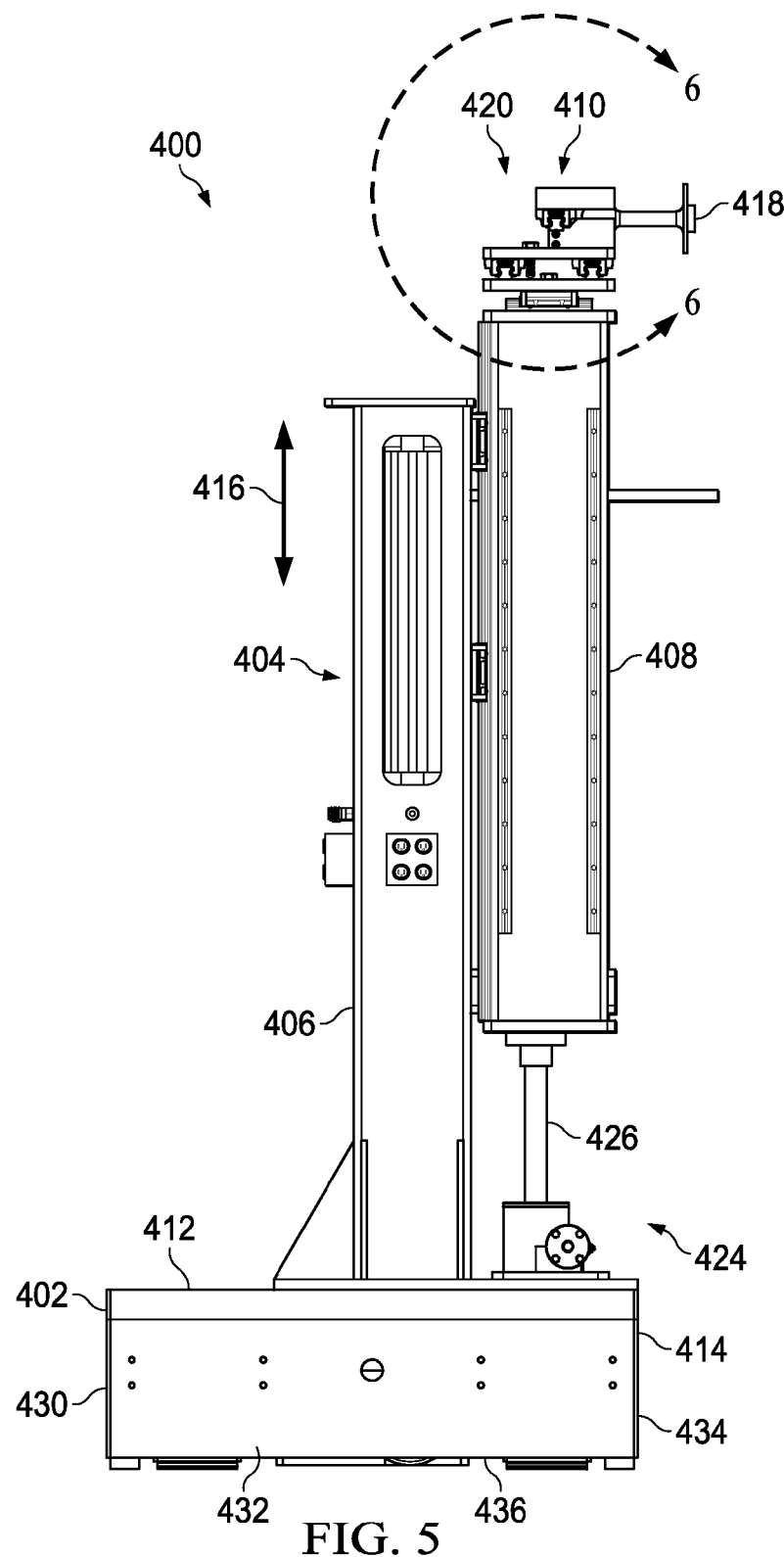
FIG. 5 is an illustration of a side view of a mobile fixture in accordance with an illustrative embodiment.

Turning next to FIG. 5, an illustration of a side view of a mobile fixture is depicted in accordance with an illustrative embodiment. In this figure, a side view of mobile fixture 400 from side 432 of motorized base 402 is illustrated taken with respect to lines 5-5.

Figure 6:
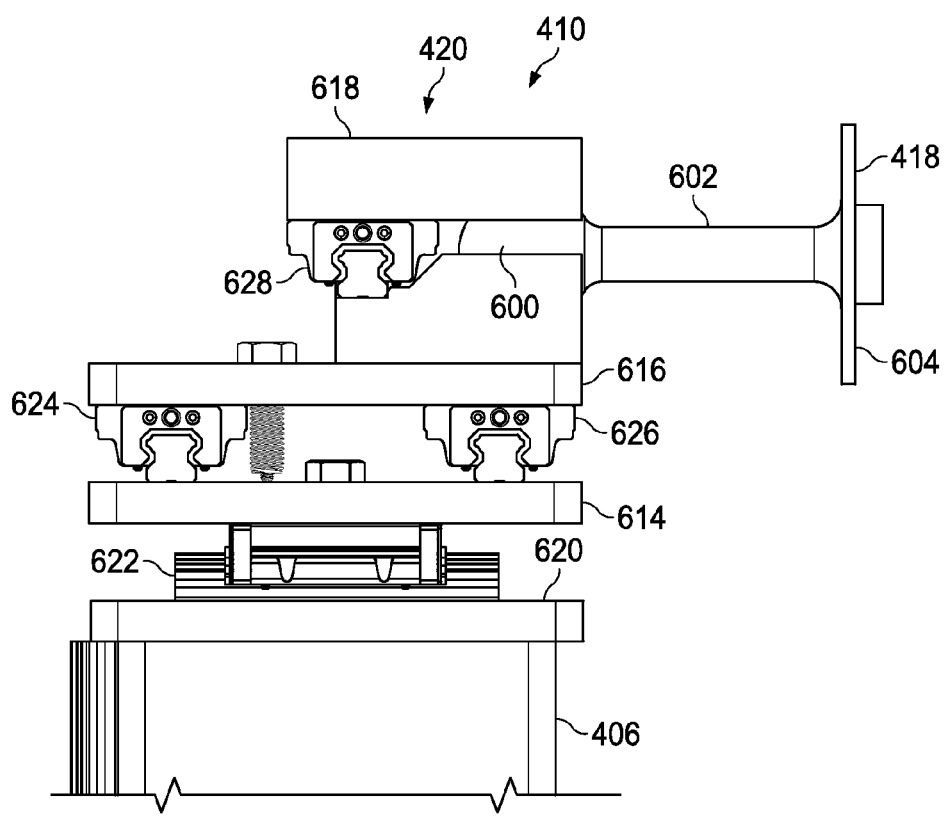
FIG. 6 is an illustration of a side view of a connector system in a mobile fixture in accordance with an illustrative embodiment.

Turning now to FIG. 6, an illustration of a side view of a connector system in a mobile fixture is depicted in accordance with an illustrative embodiment. In this illustrative example, a more-detailed view of connector system 410 taken with respect to lines 6-6 is illustrated. In this illustrative example, connector 418 may comprise spherical bearing 600, member 602, and attachment member 604. Spherical bearing 600 may be a base of connector 418. Member 602 may extend from spherical bearing 600. Attachment member 604 may be configured to be connected to a structure, such as a spar (not shown).

As illustrated, positioning system 420 may include planar member 614, planar member 616, and locking system 618. In this illustrative example, planar member 614 may be connected to surface 620 of post 406 by guide 622 and another guide (not shown). Planar member 614 may be connected to planar member 616 by guide 624 and guide 626. These guides may allow planar member 614 to move relative to surface 620 of post 406 and planar member 616 to move relative to planar member 614.

Guide 628 in locking system 618 may allow movement of locking system 618. This movement of locking system 618 may allow connector 418 to move as well as lock connector 418 into place.

In these illustrative examples, guides 624, 626, and 622 may be free to move when mobile fixture 400 in FIG. 4 is stationary. In this manner, guides 624, 626, and 622 may move during assembly, fabrication, and/or other manufacturing operations. This ability of guides 624, 626, and 622 to move may prevent inducing loads into an aircraft structure (not shown) being assembled or processed. When mobile fixture 400 begins to move, guides 624, 626, and 622 may be fixed to prevent inertial loading. In other words, these guides may not move when an aircraft structure (not shown) is being transported by mobile fixture 400.

In these illustrative examples, one or more of guide 622, guide 624, guide 626, and guide 628 may be moved by operators 318 in FIG. 3. In some cases, one or more of guide 622, guide 624, guide 626, and guide 628 may be motorized guides that may be moved under the control of controller 326 in FIG. 3.

Figure 7:
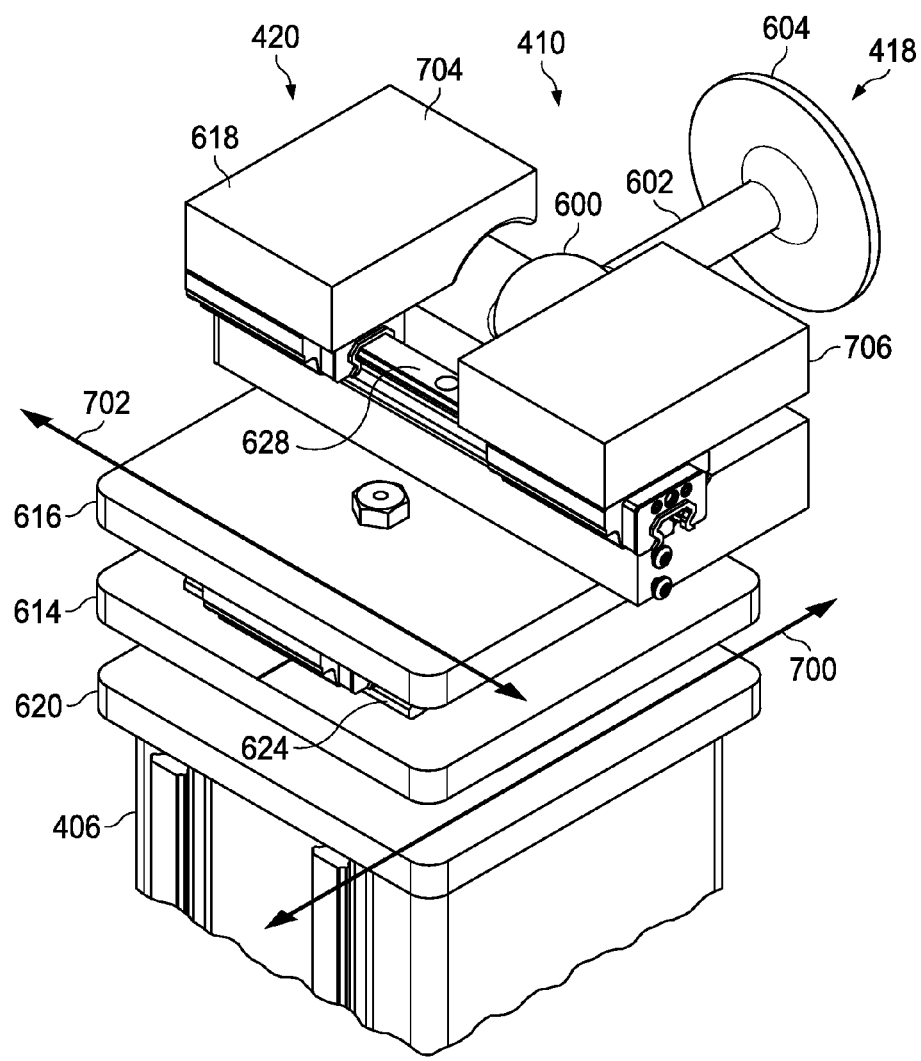
FIG. 7 is another illustration of an isometric view of a connector system in accordance with an illustrative embodiment.

Turning next to FIG. 7, another illustration of an isometric view of a connector system is depicted in accordance with an illustrative embodiment. In this illustrative example, an isometric view of positioning system 420 for connector system 410 in portion 500 of mobile fixture 400 may be seen.

In this illustrative example, planar member 614 may move in the direction of arrow 700. Planar member 616 may move in the direction of arrow 702. As a result, planar member 614 and planar member 616 may provide for movement about two axes in this illustrative example.

Additionally, section 704 and section 706 of locking system 618 may move in the direction of arrow 702. Movement of section 704 and section 706 away from each other may allow connector 418 to move. Movement of section 704 and section 706 toward each other may lock connector 418 in place.

Figure 8:
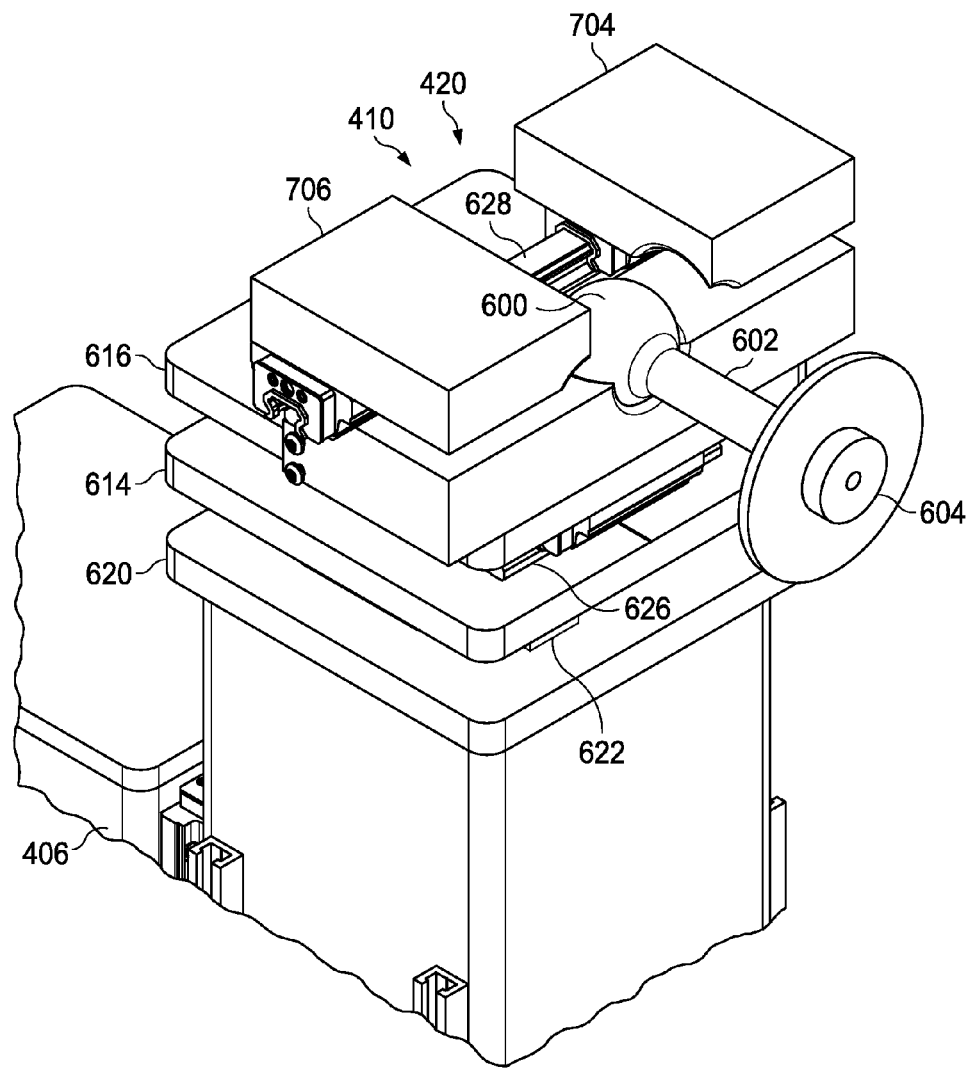
FIG. 8 is an illustration of yet another isometric view of a connector system in accordance with an illustrative embodiment.

With reference now to FIG. 8, an illustration of yet another isometric view of connector system 410 is depicted in accordance with an illustrative embodiment. This isometric view of connector system 410 may be rotated about 90 degrees clockwise with respect to the isometric view of connector system 410 in FIG. 7.

Figure 9:
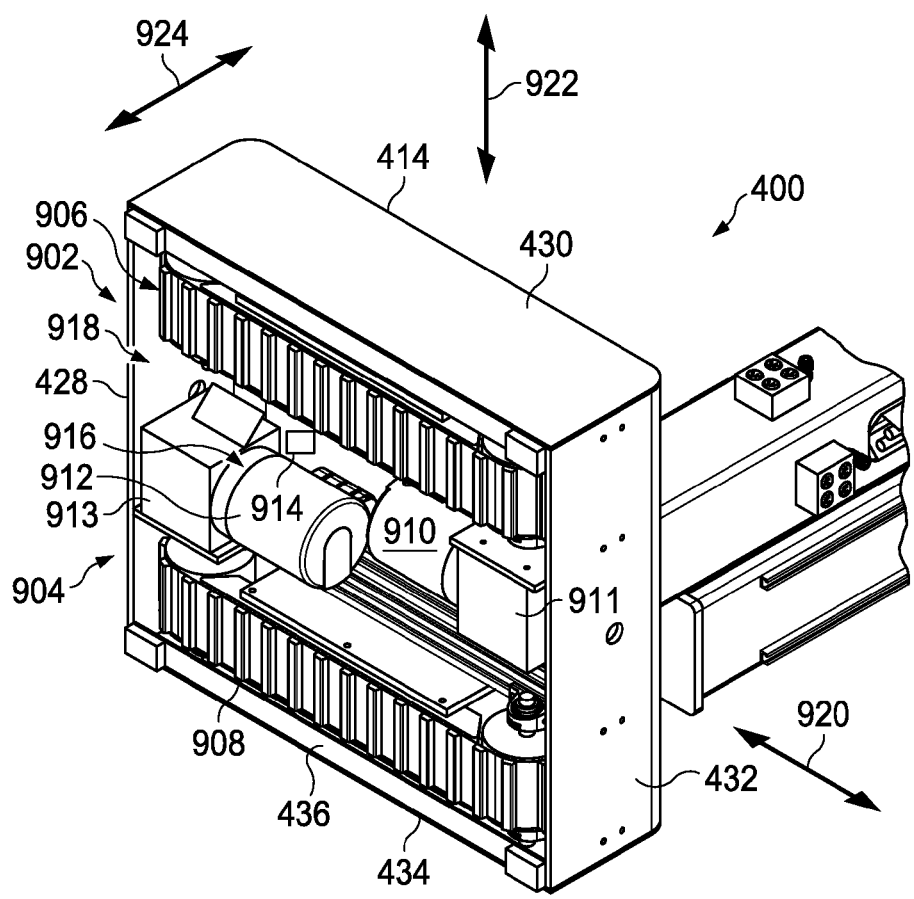
FIG. 9 is an illustration of a bottom view of a mobile fixture from a bottom of a motorized base for the mobile fixture in accordance with an illustrative embodiment.

With reference now to FIG. 9, an illustration of a bottom view of a mobile fixture from a bottom of a motorized base for the mobile fixture is depicted in accordance with an illustrative embodiment. In this illustrative example, a bottom view of mobile fixture 400 is seen from bottom 436 of motorized base 402 for mobile fixture 400.

In this view, tracks 902 and number of motors 904 may be seen. In this illustrative example, tracks 902 may be magnetic track 906 and magnetic track 908. Number of motors 904 may include motor 910 and motor 912. Motor 910 may be connected to magnetic track 906 by gear reducer 911. Motor 912 may be connected to magnetic track 908 by gear reducer 913.

Also, in this view, controller 914 may be connected to interior surface 918 of housing 414. Also illustrated is wireless power unit 916. Wireless power unit 916 may generate power for motor 910, motor 912, and controller 914.

In these illustrative examples, motorized base 402 of mobile fixture 400 in FIG. 4 may move in different directions, such as those indicated by arrows 920, 922, and 924. In other words, mobile fixture 400 may be moved forward or backward and may turn, rotate, and perform other types of movements with tracks 902.

Figure 10:
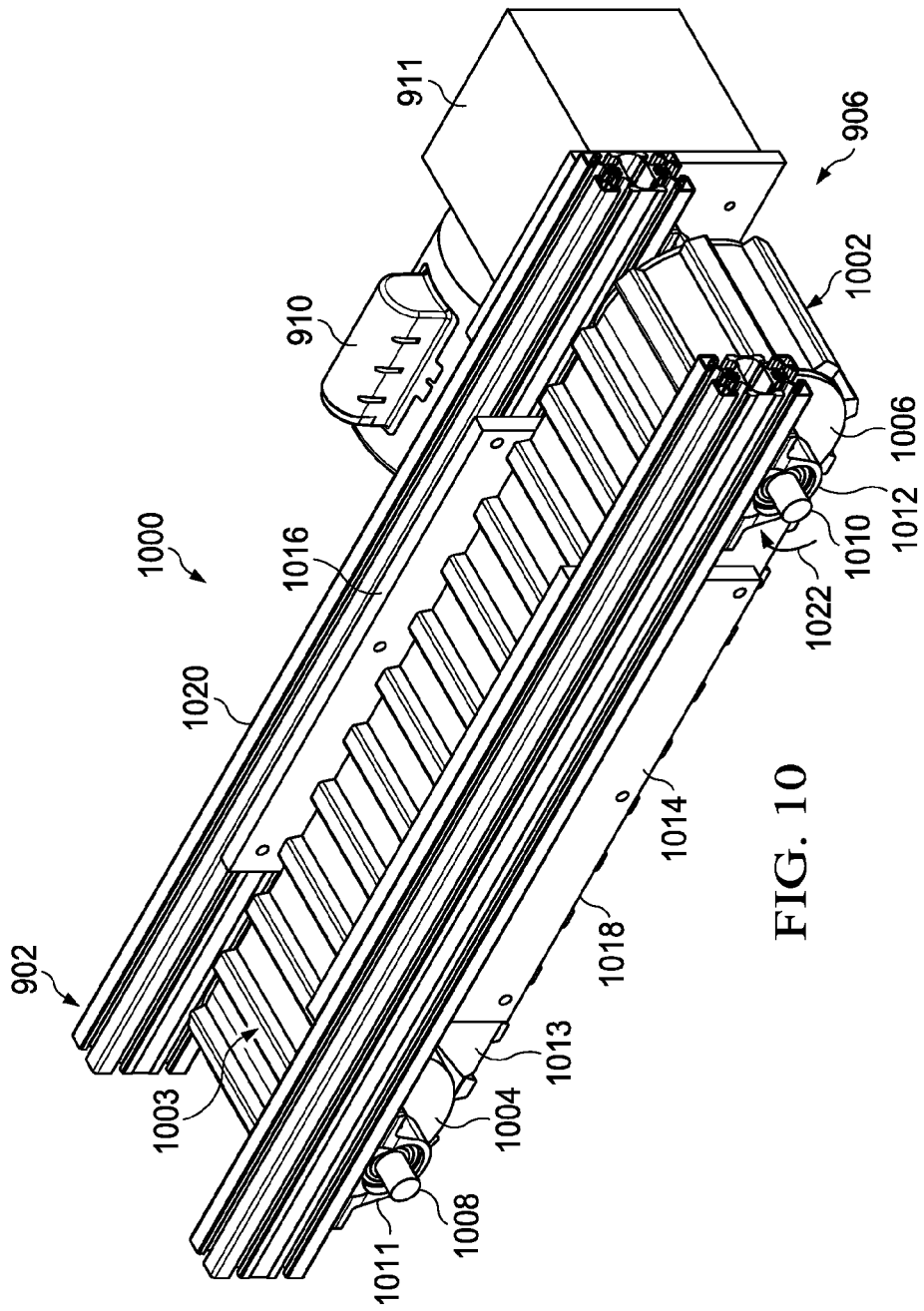
FIG. 10 is an illustration of an isometric view of a magnetic track and a motor for a mobile fixture in accordance with an illustrative embodiment.

Turning now to FIG. 10, an illustration of an isometric view of a magnetic track and a motor for a mobile fixture is depicted in accordance with an illustrative embodiment. In this illustrative example, an isometric view of magnetic track 906 and motor 910 for mobile fixture 400 from FIG. 9 are seen. As depicted, magnetic track 906 may comprise frame 1000. Motor 910 may be connected to gear reducer 911, which is connected to frame 1000 in this illustrative example. Gear reducer 911 may be connected to magnetic track 906. Motor 910 may turn and generate motion in gear reducer 911 to move magnetic track 906.

Further, magnetic track 906 may include belt 1002 with magnets 1003. Belt 1002 may be placed around wheel 1004 and wheel 1006.

Wheel 1004 may be connected to shaft 1008. Wheel 1006 may be connected to shaft 1010. Shaft 1008 may be connected to frame 1000 by bracket 1011 and another bracket (not shown). Shaft 1010 may be connected to frame 1000 by bracket 1012 and another bracket (not shown).

Magnetic track 906 also may include channel 1013. Channel 1013 may be configured to contact belt 1002 and may guide belt 1002 during operation of magnetic track 906. Further, channel 1013 may be comprised of steel or some other material that may be configured to be attracted to magnets 1003.

Plate 1014 and plate 1016 may be present on side 1018 and side 1020, respectively, of magnetic track 906. In these illustrative examples, plate 1014 and plate 1016 may be comprised of aluminum. Channel 1013 may be comprised of steel in these illustrative examples.

In this illustrative example, motor 910 may rotate shaft 1010, which may cause wheel 1006 to rotate in the direction of arrow 1022. Rotation of wheel 1006 may also cause movement of belt 1002.

Figure 11:
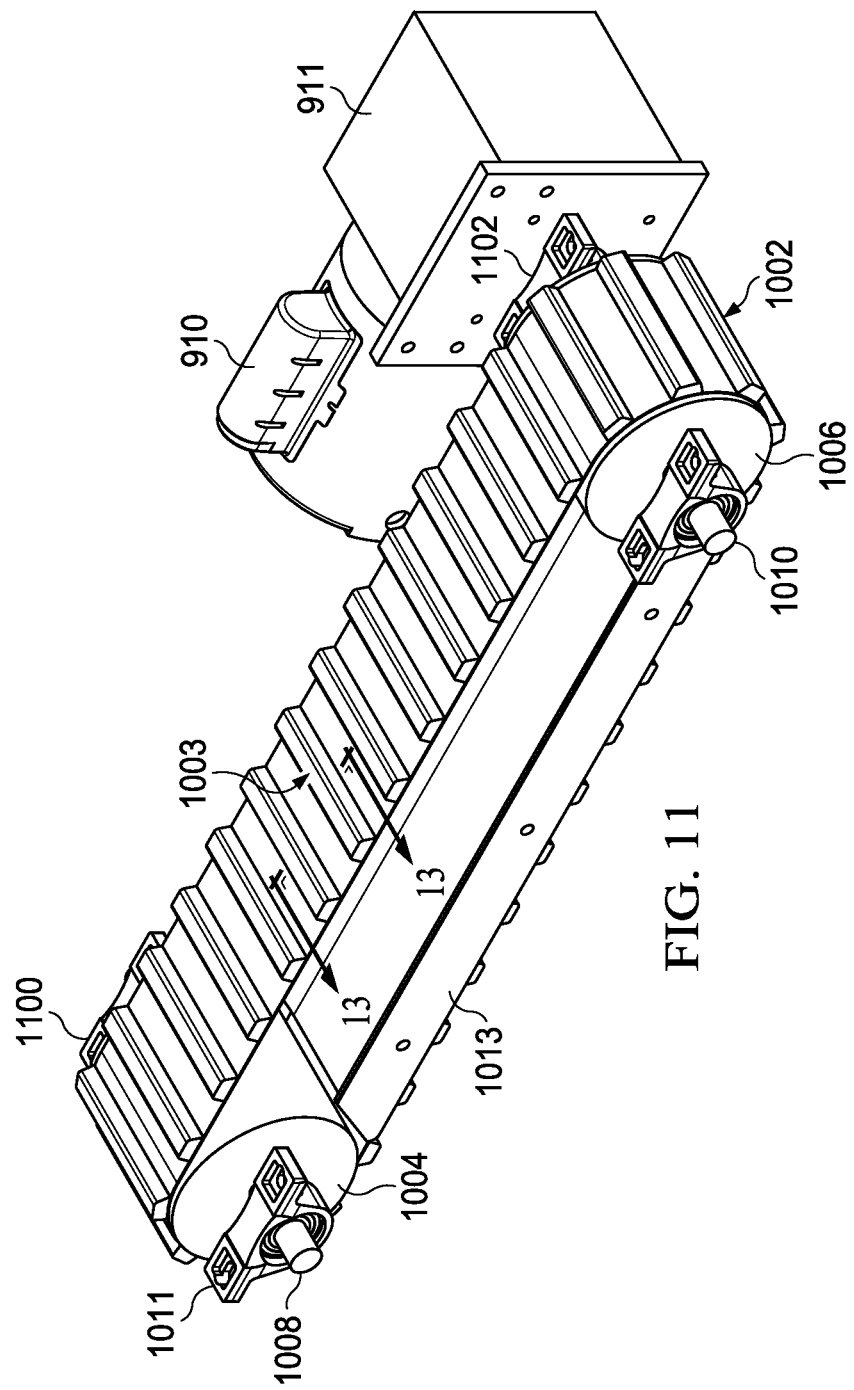
FIG. 11 is another illustration of an isometric view of a magnetic track and a motor in accordance with an illustrative embodiment.

Turning now to FIG. 11, another illustration of an isometric view of a magnetic track and a motor is depicted in accordance with an illustrative embodiment. In this illustrative example, frame 1000, plate 1014, and plate 1016 for magnetic track 906 in FIG. 10 are not shown to provide a better view of channel 1013, wheel 1004, and wheel 1006. In this view, bracket 1100 and bracket 1102 also may be seen.

Figure 12:
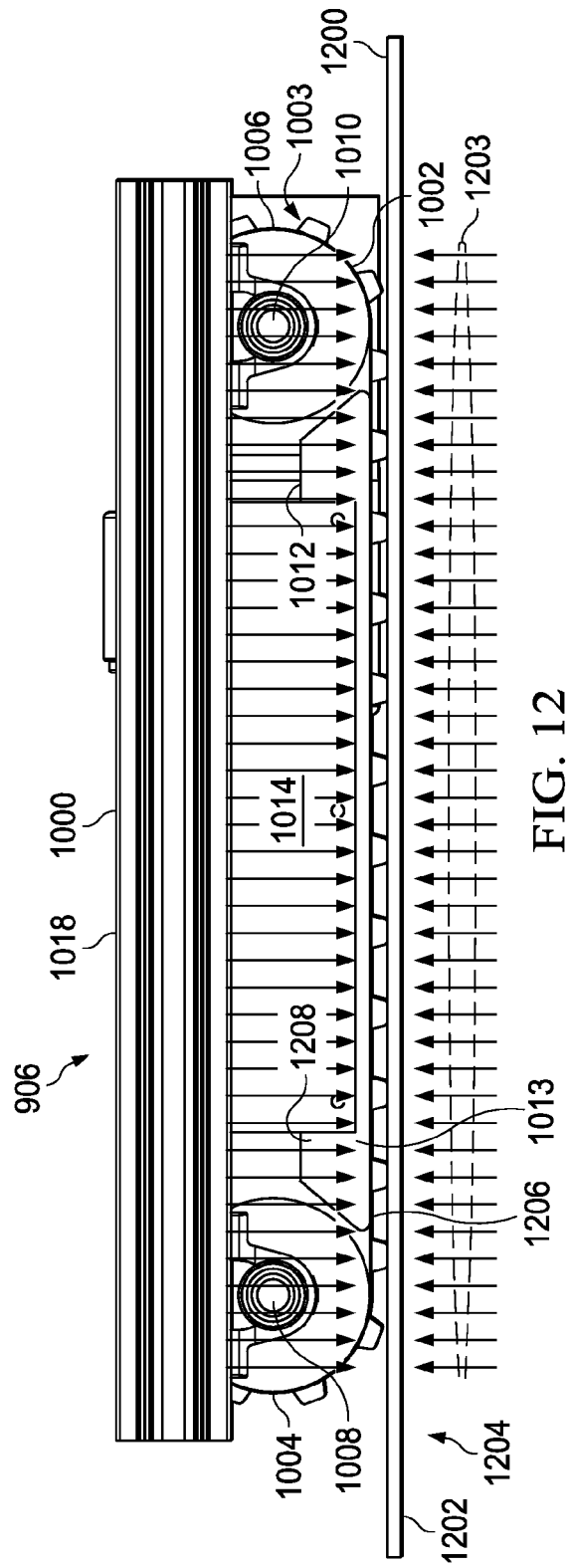
FIG. 12 is an illustration of a side view of a portion of a magnetic track on a surface in accordance with an illustrative embodiment.

Turning now to FIG. 12, an illustration of a side view of a portion of a magnetic track on a surface is depicted in accordance with an illustrative embodiment. In this illustrative example, a side view of a portion of magnetic track 906 from FIG. 10 may be seen engaged with steel plate 1200 on surface 1202 of floor 1204.

In this illustrative example, magnets 1003 on belt 1002 may result in attraction to at least one of channel 1013 and steel plate 1200 as illustrated by arrows 1203. This attraction may provide a desired contact to floor 1204 during movement. In other words, magnets 1003 on belt 1002 in conjunction with channel 1013 in steel plate 1200 on surface 1202 of floor 1204 may provide a desired amount of traction for mobile fixture 400 in FIG. 4.

Further, channel 1013 may have coating 1206. Coating 1206 may be a coating that has a friction coefficient that may be desirable to allow movement of belt 1002. In this illustrative example, the coating may be polyethylene, which may allow easier movement of belt 1002.

Figure 13:
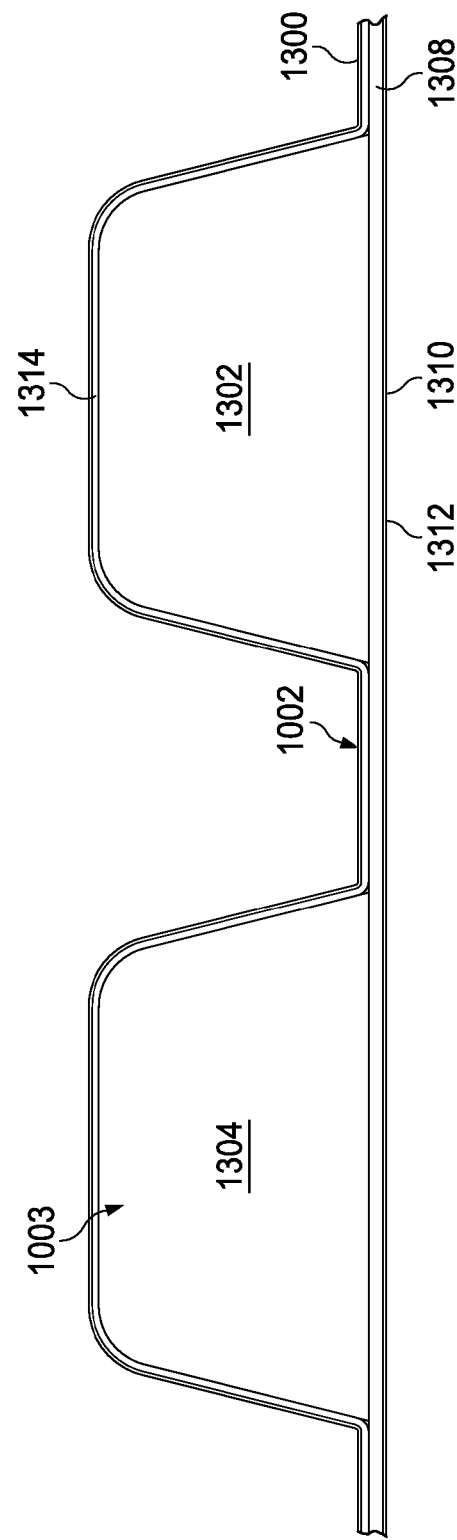
FIG. 13 is an illustration of a cross-sectional view of a portion of a belt with magnets for a magnetic track in accordance with an illustrative embodiment.

With reference now to FIG. 13, an illustration of a cross-sectional view of a portion of a belt with magnets for a magnetic track is depicted in accordance with an illustrative embodiment. In this illustrative example, a cross-sectional view of a portion of belt 1002 for magnetic track 906 is seen. As depicted, the portion of magnets 1003 from FIG. 10 seen include magnet 1302 and magnet 1304. Belt 1002 may be comprised of layer 1300 and layers 1308. Layer 1300 may encompass magnet 1302 and magnet 1304.

Layers 1308 may be formed from layers of graphite tape with an outer layer of fiberglass. Coating 1310 may be present on surface 1312 of layers 1308. Surface 1314 of layers 1308 may contact a floor (not shown), while coating 1310 of surface 1312 may contact a channel (not shown).

Turning now to FIG. 14, an illustration of a carrier system is depicted in accordance with an illustrative embodiment. Carrier system 1400 may be an example of an implementation of carrier system 306 in FIG. 3.

In this illustrative example, carrier system 1400 may be used to carry structure 1402. Structure 1402 may be wing 1404 in these illustrative examples. As depicted, carrier system 1400 may comprise plurality of mobile fixtures 1406.

Plurality of mobile fixtures 1406 may be present on side 1408 and side 1410 of wing 1404. In these illustrative examples, plurality of mobile fixtures 1406 may coordinate movement to move wing 1404 in the direction of arrow 1412 and/or arrow 1425. Further, plurality of mobile fixtures 1406 may move wing 1404 while maintaining desired orientation 1414.

As depicted, plurality of mobile fixtures 1406 may also move wing 1404 in the direction of arrow 1415 or arrow 1416, may rotate wing 1404 about x-axis 1422, y-axis 1424, and/or z-axis 1423, and/or may perform other movements of wing 1404.

In these illustrative examples, a first portion of mobile fixtures in plurality of mobile fixtures 1406 may move wing 1404, while a second portion of mobile fixtures in plurality of mobile fixtures 1406 may be moved. For example, mobile fixture 1420 in plurality of mobile fixtures 1406 may apply a force to move wing 1404 along x-axis 1422 and y-axis 1424. Mobile fixture 1426 may apply a force to move in the direction of x-axis 1422 but may be free to move along y-axis 1424. A mobile fixture is "free" in a direction when the mobile fixture is configured to be moved without applying a force in that direction.

Mobile fixtures 1428 in plurality of mobile fixtures 1406 may be free to be moved in both x-axis 1422 and y-axis 1424. In other words, mobile fixtures 1428 may not exert a force to move wing 1404.

Mobile fixtures 1430 in plurality of mobile fixtures 1406 may apply a force in the direction of y-axis 1424 but may be free to be moved along x-axis 1422.

Of course, other groupings of plurality of mobile fixtures 1406 may be made to apply a force to move wing 1404 in various directions along and/or about x-axis 1422, y-axis 1424, and/or z-axis 1423. In some examples, all of plurality of mobile fixtures 1406 may apply a force to move wing 1404. In yet other illustrative examples, none of plurality of mobile fixtures 1406 may apply a force. Instead, a force may be applied by another source.

These movements of plurality of mobile fixtures 1406 may be considered to be in a coordinated manner. The fixed and free directions of plurality of mobile fixtures 1406 may be controlled by carrier controller 332 in FIG. 3 or through communications between controllers (not shown) in plurality of mobile fixtures 1406. Portion 1432 of carrier system 1400 may be shown in greater detail in FIG. 16 below.

Turning now to FIG. 15, an illustration of a side view of a carrier system with a wing is depicted in accordance with an illustrative embodiment. In this figure, a side view of wing 1404 supported by plurality of mobile fixtures 1406 in FIG. 14 is seen from side 1408 of wing 1404. As can be seen, plurality of mobile fixtures 1406 may be connected to side 1408 of wing 1404 as well as side 1410 of wing 1404.

Figure 16:
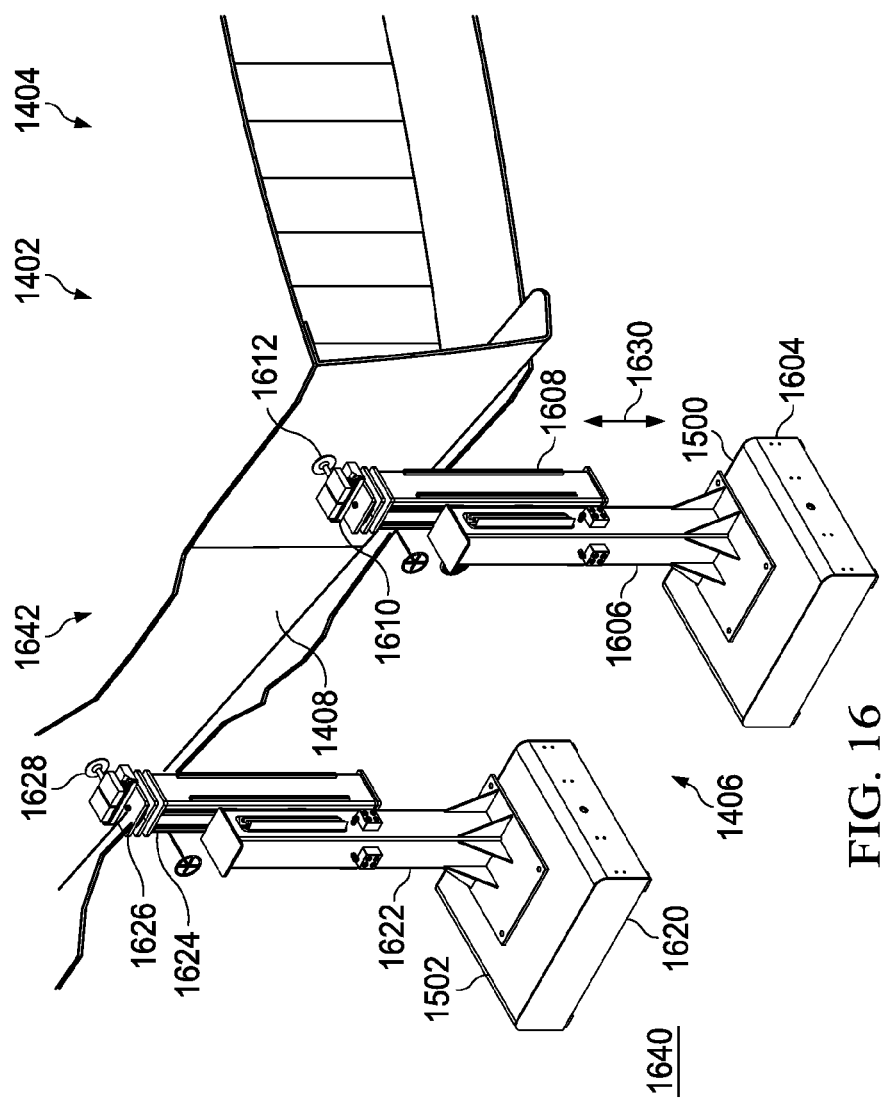
FIG. 16 is a more-detailed illustration of a portion of a carrier system supporting a wing in accordance with an illustrative embodiment.

A more-detailed illustration of a connection of mobile fixture 1500 and mobile fixture 1502 in plurality of mobile fixtures 1406 to side 1408 of wing 1404 is illustrated in FIG. 16.

Turning now to FIG. 16, a more-detailed illustration of a portion of a carrier system supporting a wing is depicted in accordance with an illustrative embodiment. In this illustrative example, portion 1432 of carrier system 1400 from FIG. 14 may be seen in greater detail. As depicted, mobile fixture 1500 and mobile fixture 1502 may be part of plurality of mobile fixtures 1406. Mobile fixture 1500 and mobile fixture 1502 may be shown connected to side 1408 of wing 1404.

In this illustrative example, mobile fixture 1500 may have motorized base 1604, post 1606, member 1608, and connector system 1610. As illustrated, connector system 1610 may be connected to spar 1612 of wing 1404. Mobile fixture 1502 also may have motorized base 1620, post 1622, member 1624, and connector system 1626. In this example, connector system 1626 may be connected to spar 1628 in wing 1404. As illustrated, member 1608 may be moveable in the direction of arrow 1630. Member 1624 also may be moveable in the direction of arrow 1630. Each of these members may be individually moveable to provide a desired connection to wing 1404. Further, these members may be adjusted to take into account variations that may occur in floor 1640. As a result, if floor 1640 is uneven, member 1624 and member 1608 may adjust to maintain desired orientation 1642 for wing 1404.

Figure 17:
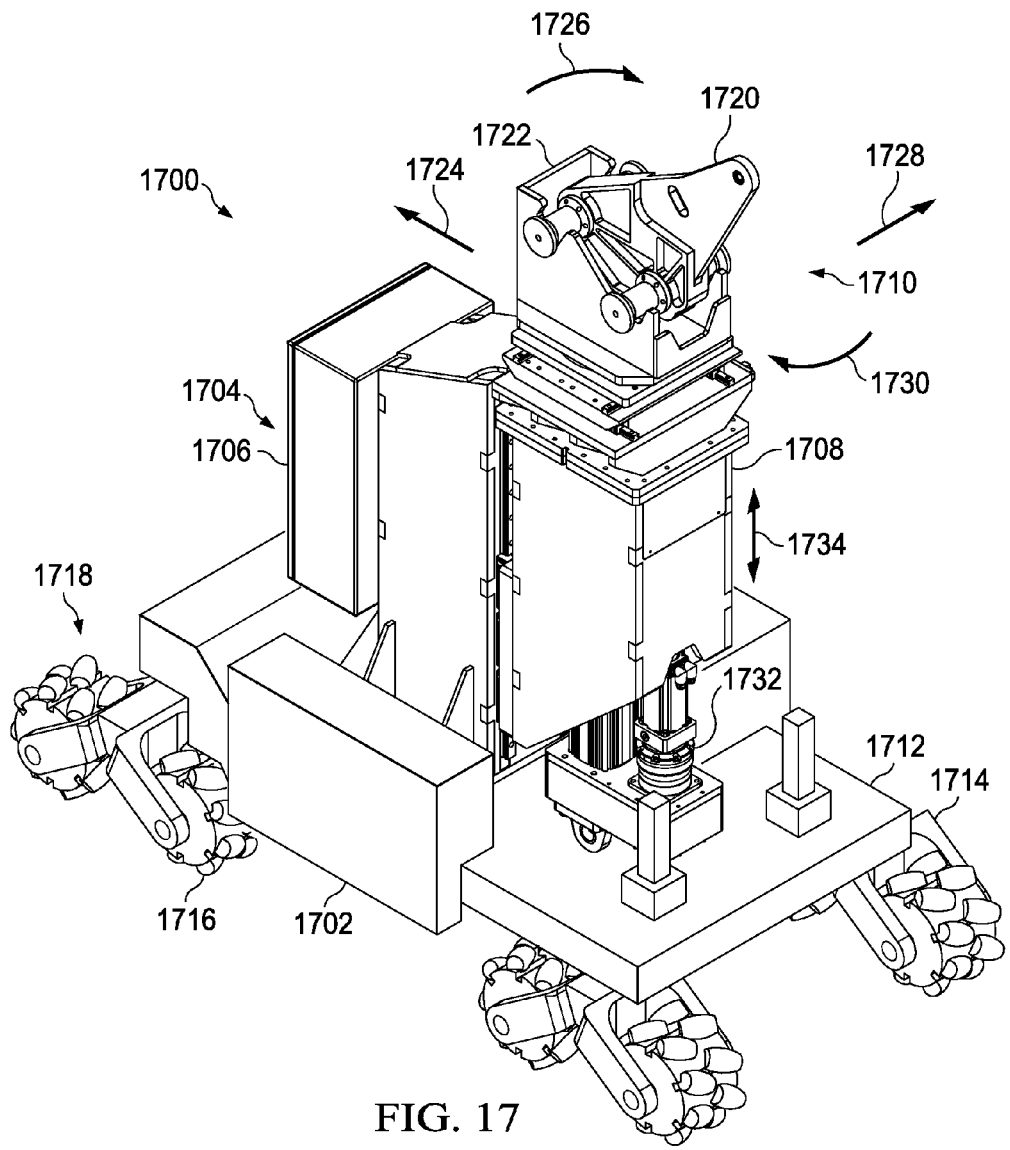
FIG. 17 is an illustration of an isometric view of a mobile fixture in accordance with an illustrative embodiment.

Turning next to FIG. 17, an illustration of an isometric view of a mobile fixture is depicted in accordance with an illustrative embodiment. In this illustrative example, mobile fixture 1700 is an example of one implementation for mobile fixture 320 in FIG. 3. Further, in some illustrative examples, mobile fixture 1700 may be used to implement one or more plurality of mobile fixtures 1406 in FIG. 14.

As depicted, mobile fixture 1700 may have motorized base 1702 and support system 1704. As illustrated, support system 1704 may comprise post 1706, member 1708, and connector system 1710. As depicted, post 1706 may extend from surface 1712 of housing 1714 for motorized base 1702. In this illustrative example, motorized base 1702 may employ wheels 1716. Wheels 1716 may take the form of motorized wheels 1718.

As illustrated, connector system 1710 may comprise connector 1720 and positioning system 1722. In this illustrative example, positioning system 1722 may provide for movement in the direction of arrow 1724, arrow 1726, arrow 1728, and arrow 1730. Movement system 1732 also may be seen in this view. Movement system 1732 may move member 1708 in the direction of arrow 1734 relative to post 1706.

Figure 18:
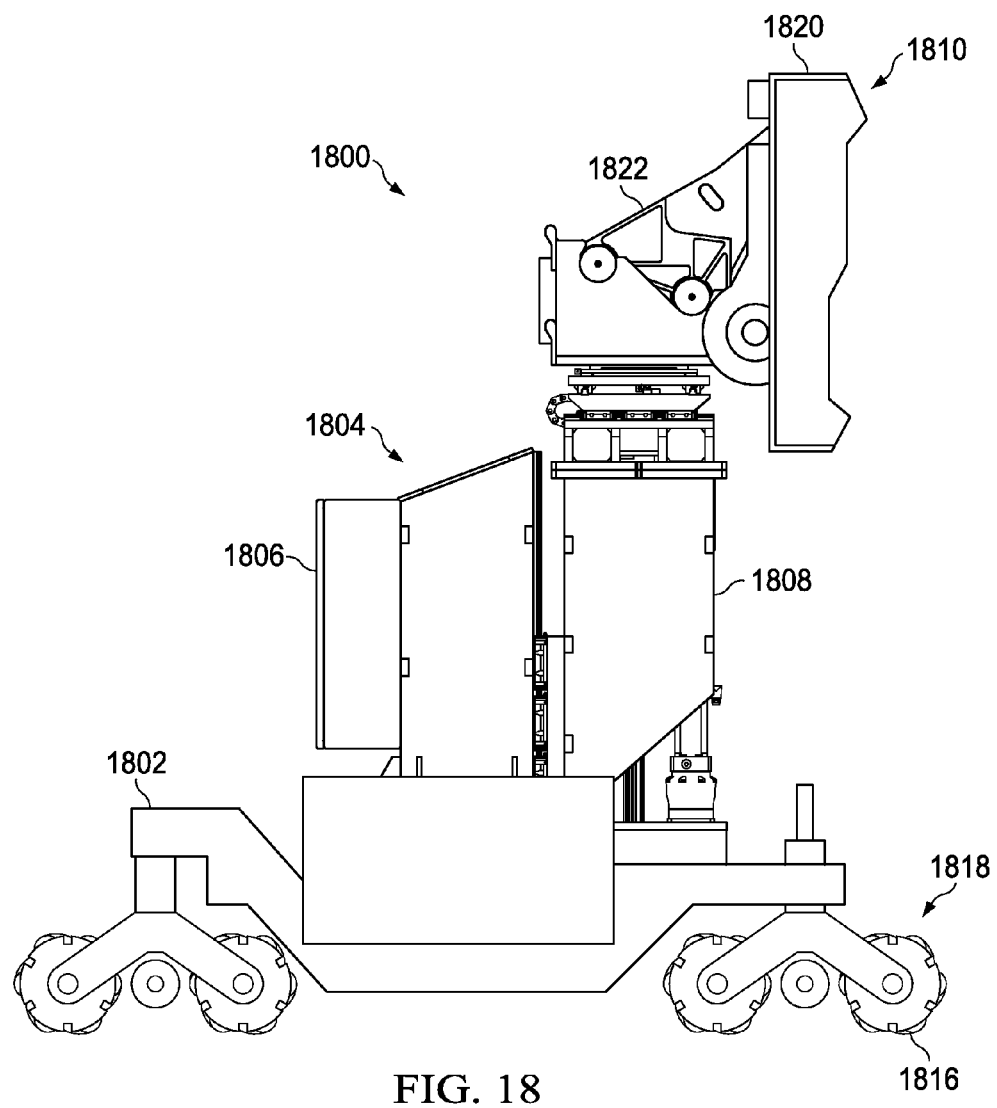
FIG. 18 is an illustration of a side view of a mobile fixture in accordance with an illustrative embodiment.

Turning now to FIG. 18, an illustration of a side view of a mobile fixture is depicted in accordance with an illustrative embodiment. In this illustrative example, mobile fixture 1800 is an example of another implementation for mobile fixture 320 in FIG. 3. Further, in some illustrative examples, mobile fixture 1800 may be used to implement one or more plurality of mobile fixtures 1406 in FIG. 14.

As depicted, mobile fixture 1800 may have motorized base 1802 and support system 1804. As illustrated, support system 1804 may comprise post 1806, member 1808, and connector system 1810.

In this illustrative example, motorized base 1802 may employ wheels 1816. Wheels 1816 may take the form of motorized wheels 1818. As illustrated, connector system 1810 may comprise connector 1820 and positioning system 1822.

Figure 19:
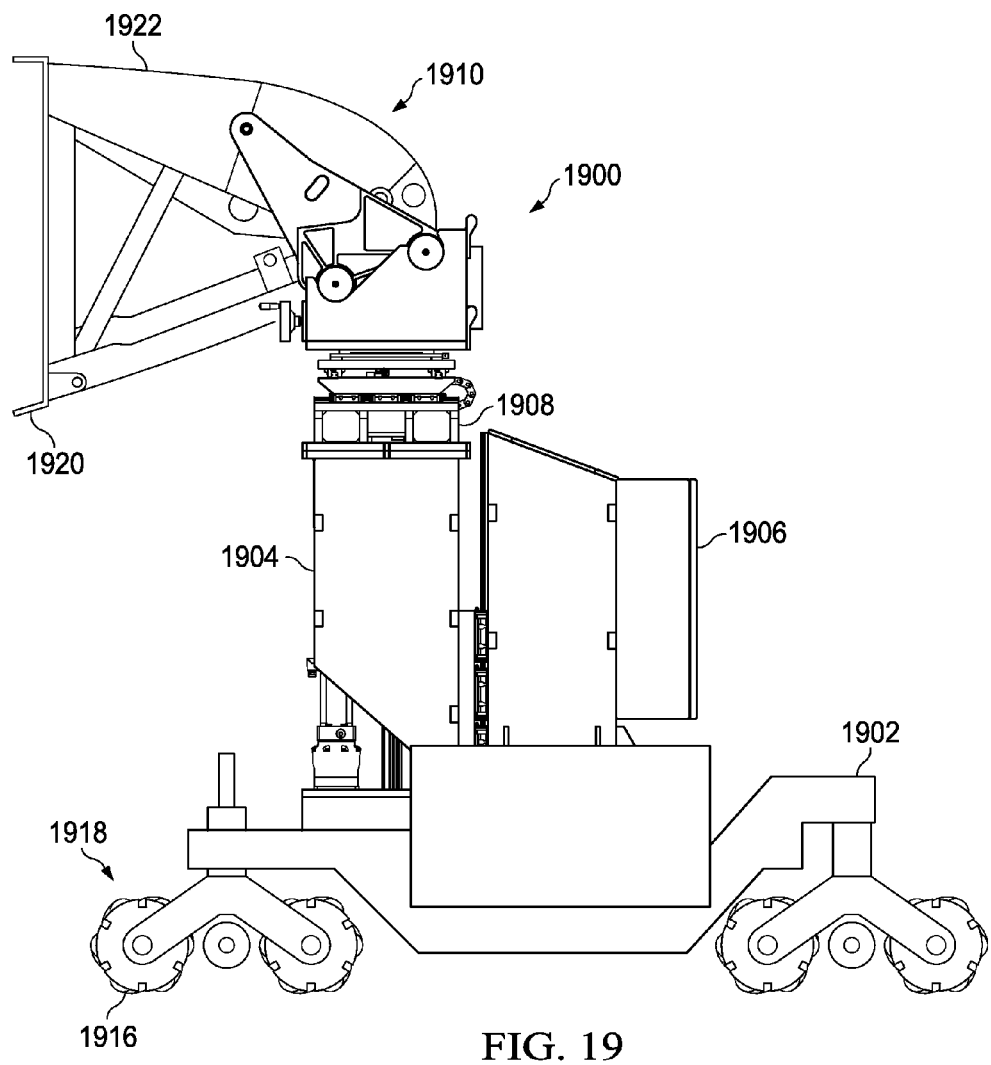
FIG. 19 is an illustration of a side view of yet another mobile fixture in accordance with an illustrative embodiment.

Turning now to FIG. 19, an illustration of a side view of yet another mobile fixture is depicted in accordance with an illustrative embodiment. In this illustrative example, mobile fixture 1900 is an example of another implementation for mobile fixture 320 in FIG. 3.

As depicted, mobile fixture 1900 may have motorized base 1902 and support system 1904. In this particular example, support system 1904 may comprise post 1906, member 1908, and connector system 1910. In this illustrative example, motorized base 1902 may employ wheels 1916. Wheels 1916 may take the form of motorized wheels 1918. As illustrated, connector system 1910 may comprise connector 1920 and positioning system 1922.

As can be seen, connector 418 for mobile fixture 400 in FIG. 4, connector system 1710 for mobile fixture 1700 in FIG. 17, connector system 1810 for mobile fixture 1800 in FIG. 18, and connector system 1910 for mobile fixture 1900 in FIG. 19 may have different configurations. Plurality of mobile fixtures 308 in FIG. 3 may include these and other configurations for connectors and mobile fixtures, depending on the particular implementation.

Figure 20:
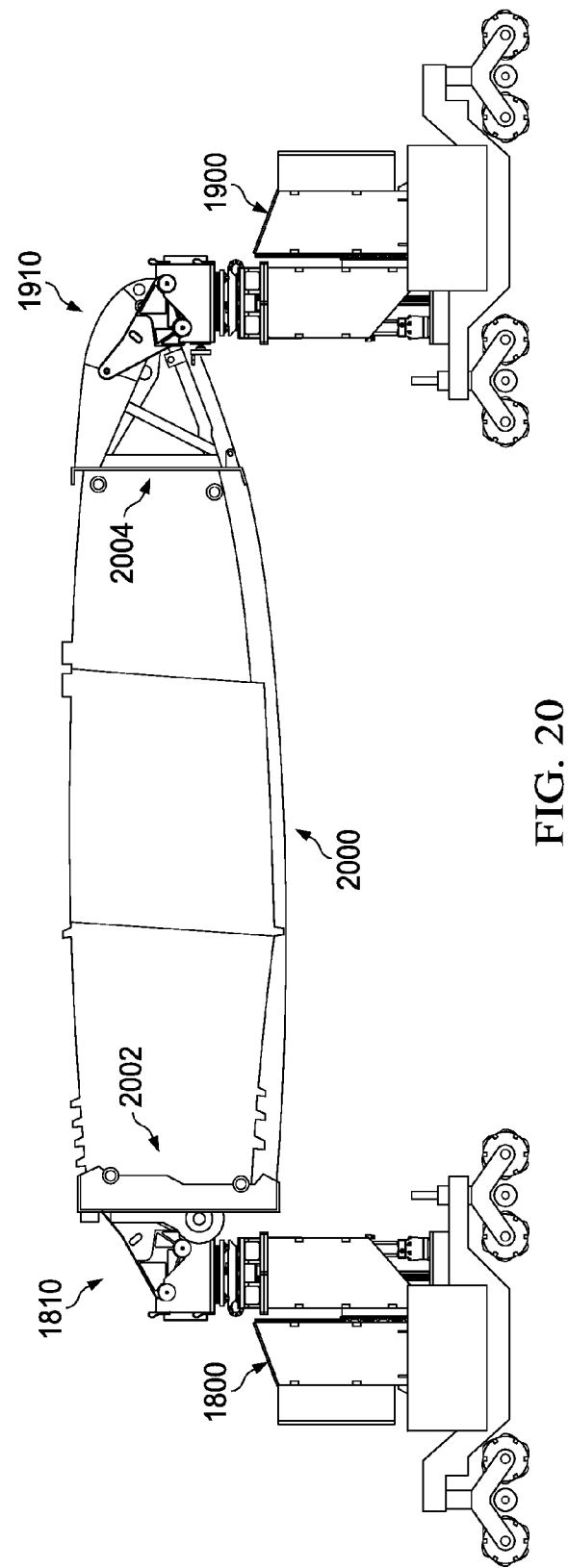
FIG. 20 is an illustration of mobile fixtures carrying a structure in accordance with an illustrative embodiment.

Turning now to FIG. 20, an illustration of mobile fixtures carrying a structure is depicted in accordance with an illustrative embodiment. In this illustrative example, mobile fixture 1800 from FIG. 18 and mobile fixture 1900 from FIG. 19 may be used to carry structure 2000. Mobile fixture 1800 may be selected, because connector system 1810 may be suited for being connected to side 2002 of structure 2000. Mobile fixture 1900 may be selected, because connector system 1910 may be suited for being connected to side 2004 of structure 2000.

Figure 21:
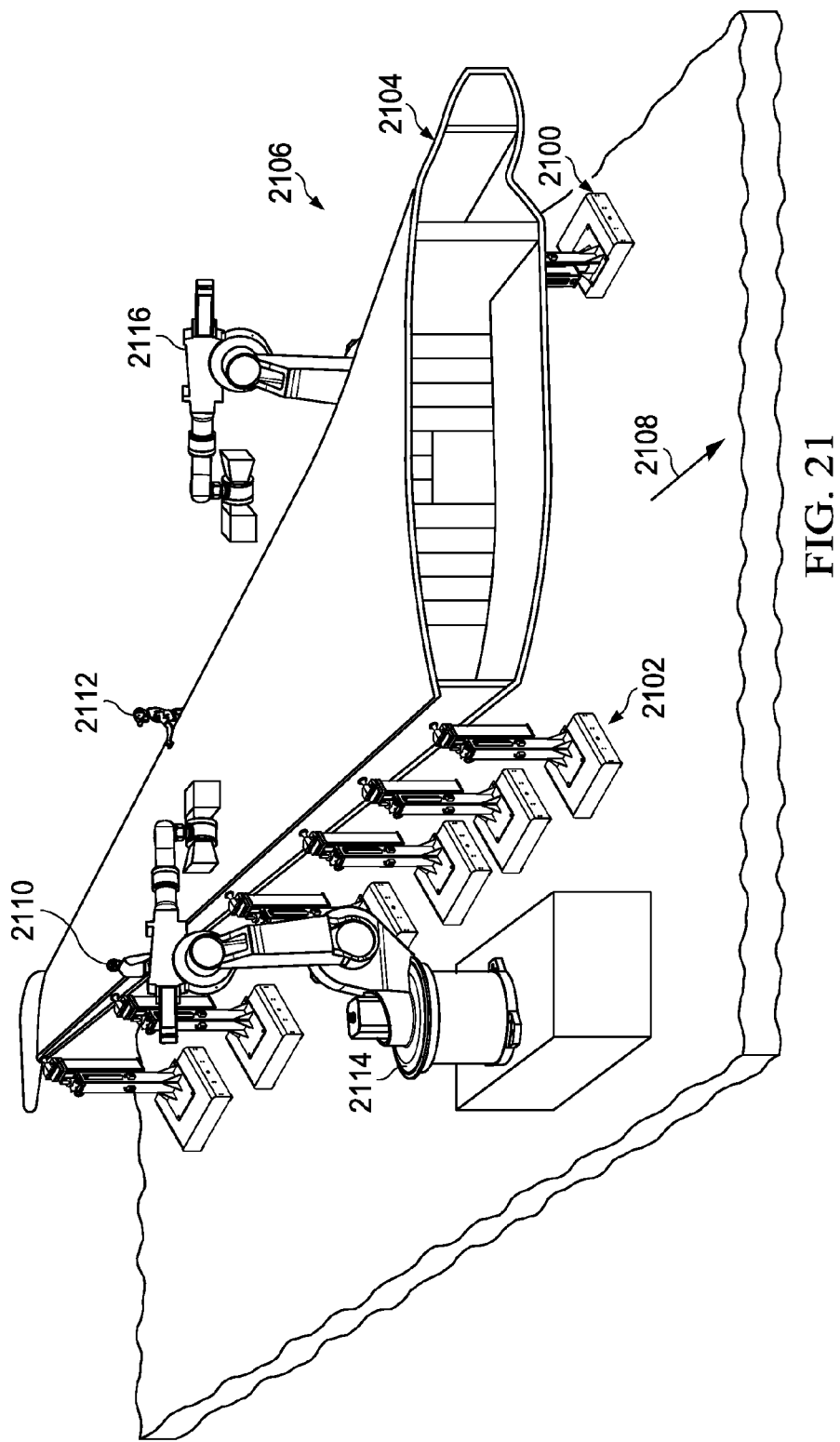
FIG. 21 is an illustration of another carrier system supporting a structure in accordance with an illustrative embodiment.

With reference now to FIG. 21, an illustration of another carrier system supporting a structure is depicted in accordance with an illustrative embodiment. In this illustrative example, carrier system 2100 may be an example of carrier system 306 in FIG. 3. As depicted, plurality of mobile fixtures 2102 may support structure 2104, which may take the form of wing 2106. In this example, carrier system 2100 may move wing 2106 in the direction of arrow 2108.

While moving in the direction of arrow 2108, different operations may be performed on wing 2106. These operations may be performed by operator 2110 and operator 2112. Operations also may be performed by tool 2114 and tool 2116. These operations may be performed while carrier system 2100 moves wing 2106 in the direction of arrow 2108 and/or while carrier system 2100 is stationary.

Figure 22:
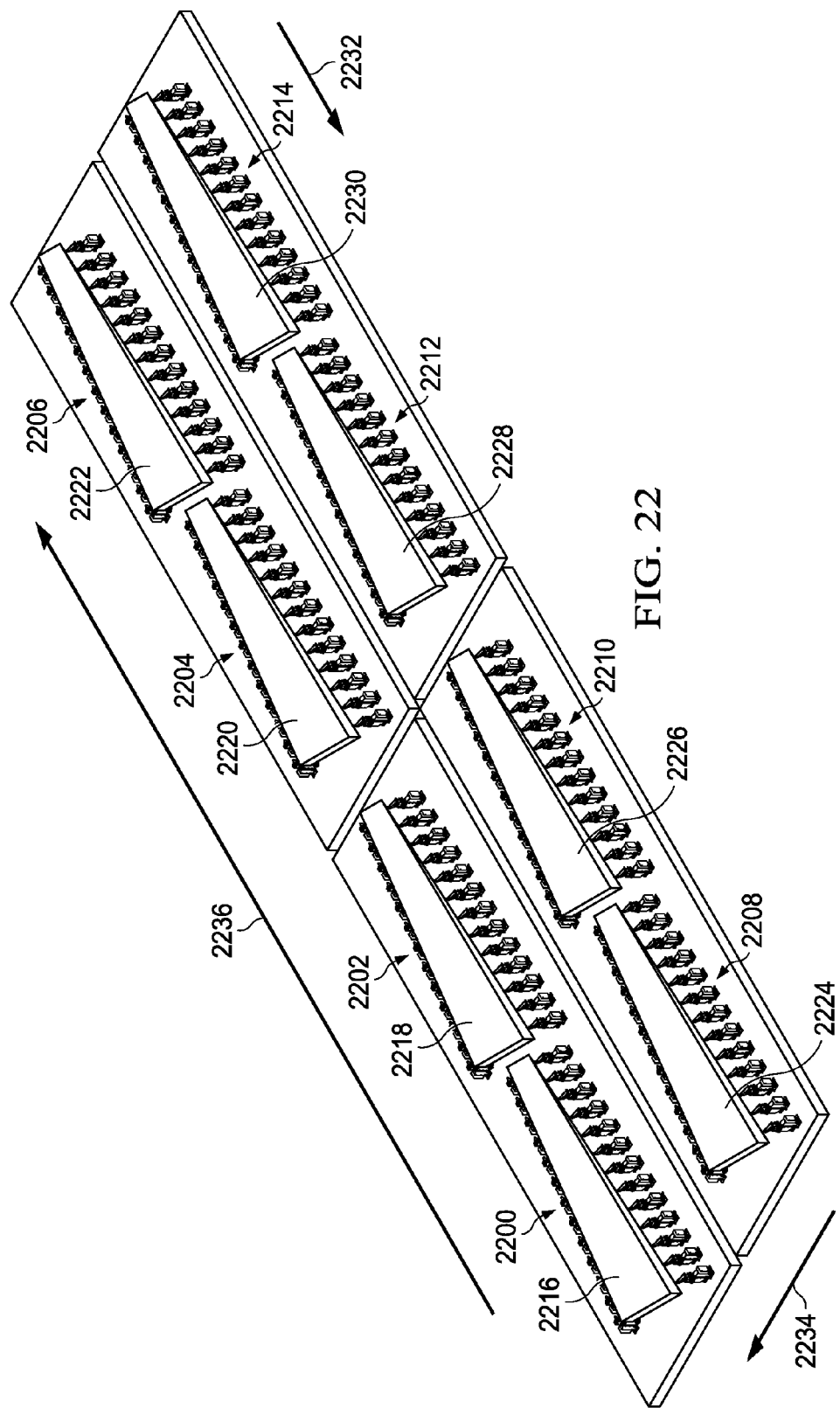
FIG. 22 is an illustration of carrier systems carrying wings in accordance with an illustrative embodiment.

Turning next to FIG. 22, an illustration of carrier systems carrying wings is depicted in accordance with an illustrative embodiment. In this illustrative example, carrier systems 2200, 2202, 2204, 2206, 2208, 2210, 2212, and 2214 may carry wings 2216, 2218, 2220, 2222, 2224, 2226, 2228, and 2230, respectively. In this example, these wings may be moved in the direction of arrows 2232, 2234, and 2236.

The different components shown in FIGS. 4-22 may be combined with components in FIG. 3, used with components in FIG. 3, or a combination of the two. Additionally, some of the components in FIGS. 4-22 may be illustrative examples of how components shown in block form in FIG. 3 can be implemented as physical structures.

With reference now to FIGS. 23-30, illustrations of a process for assembling a wing are depicted in accordance with an illustrative embodiment. In FIGS. 23-30, manufacturing environment 2300 may be an example of one implementation for manufacturing environment 300 in FIG. 3. Manufacturing environment 2300 may be an environment in which a structure, such as structure 304 from FIG. 3, may be manufactured and/or assembled.

Figure 23:
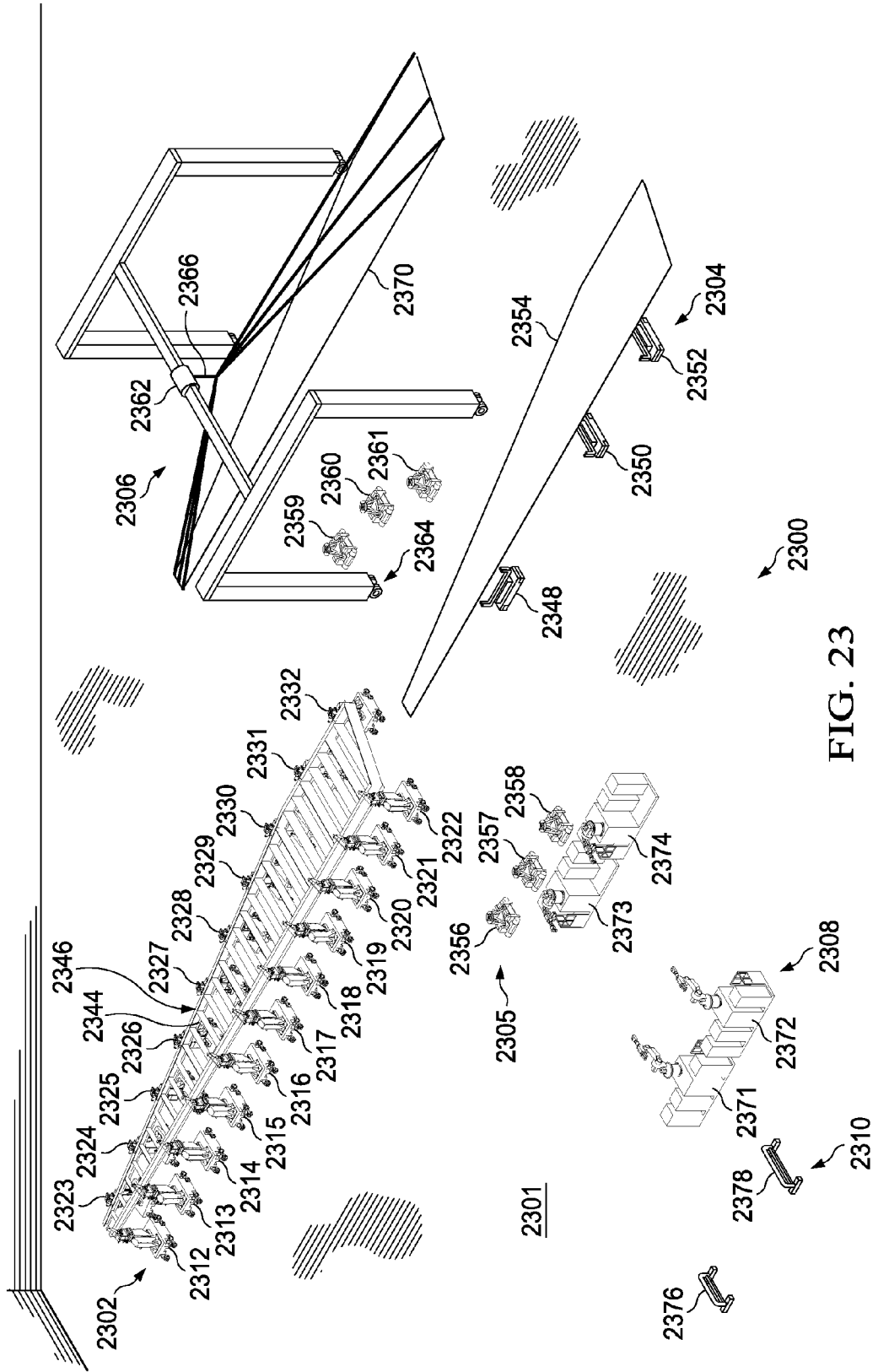
FIGS. 23-30 are illustrations of a process for assembling a wing in accordance with an illustrative embodiment.

Turning now to FIG. 23, plurality of mobile fixtures 2302, first group of tools 2304, second group of tools 2305, crane system 2306, third group of tools 2308, and fourth group of tools 2310 may be present in manufacturing environment 2300. Plurality of mobile fixtures 2302 may include mobile fixtures 2312, 2313, 2314, 2315, 2316, 2317, 2318, 2319, 2320, 2321, 2322, 2323, 2324, 2325, 2326, 2327, 2328, 2329, 2330, 2331, and 2332.

Plurality of mobile fixtures 2302 may be configured to support wing box 2344 for wing 2346 during assembly of wing 2346. Further, plurality of mobile fixtures 2302 may be configured to control an orientation of wing box 2344 during assembly of wing 2346. Plurality of mobile fixtures 2302 also may be configured to move on surface 2301 to move wing 2346 in manufacturing environment 2300. In this figure, plurality of mobile fixtures 2302 may hold wing box 2344 in an orientation configured to receive skin panel 2354 on top of wing box 2344.

First group of tools 2304 may be a group of mobile support tools. In other words, first group of tools 2304 may include tools configured to support a structure and be moved along surface 2301. As depicted, first group of tools 2304 may include support tool 2348, support tool 2350, and support tool 2352. In this illustrative example, support tool 2348, support tool 2350, and support tool 2352 may be configured to carry, support, and move skin panel 2354 for wing 2346.

Second group of tools 2305 also may include mobile tools configured to move over surface 2301. Second group of tools 2305 may be configured to perform fastening, drilling, and/or other suitable types of operations under a structure, such as wing box 2344. As depicted, second group of tools 2305 may include tool 2356, tool 2357, tool 2358, tool 2359, tool 2360, and tool 2361.

Crane system 2306 may include frame 2362, wheels 2364, and cable system 2366. Crane system 2306 may use wheels 2364 to move over surface 2301. Further, frame 2362 may be configured to be wide and tall enough to allow plurality of mobile fixtures 2302 carrying wing box 2344 to pass through and under frame 2362. As depicted, crane system 2306 may use cable system 2366 to carry and support skin panel 2370 for wing 2346.

Third group of tools 2308 may be a group of mobile tools configured to move over surface 2301. Further, third group of tools 2308 may be configured to perform fastening, drilling, and/or other suitable types of operations on top of a structure, such as wing box 2344. In this illustrative example, third group of tools 2308 may include tool 2371, tool 2372, tool 2373, and tool 2374.

Fourth group of tools 2310 may include tool 2376 and tool 2378. Tool 2376 and tool 2378 may be stationary support fixtures configured to carry the fully assembled wing 2346.

Figure 24:
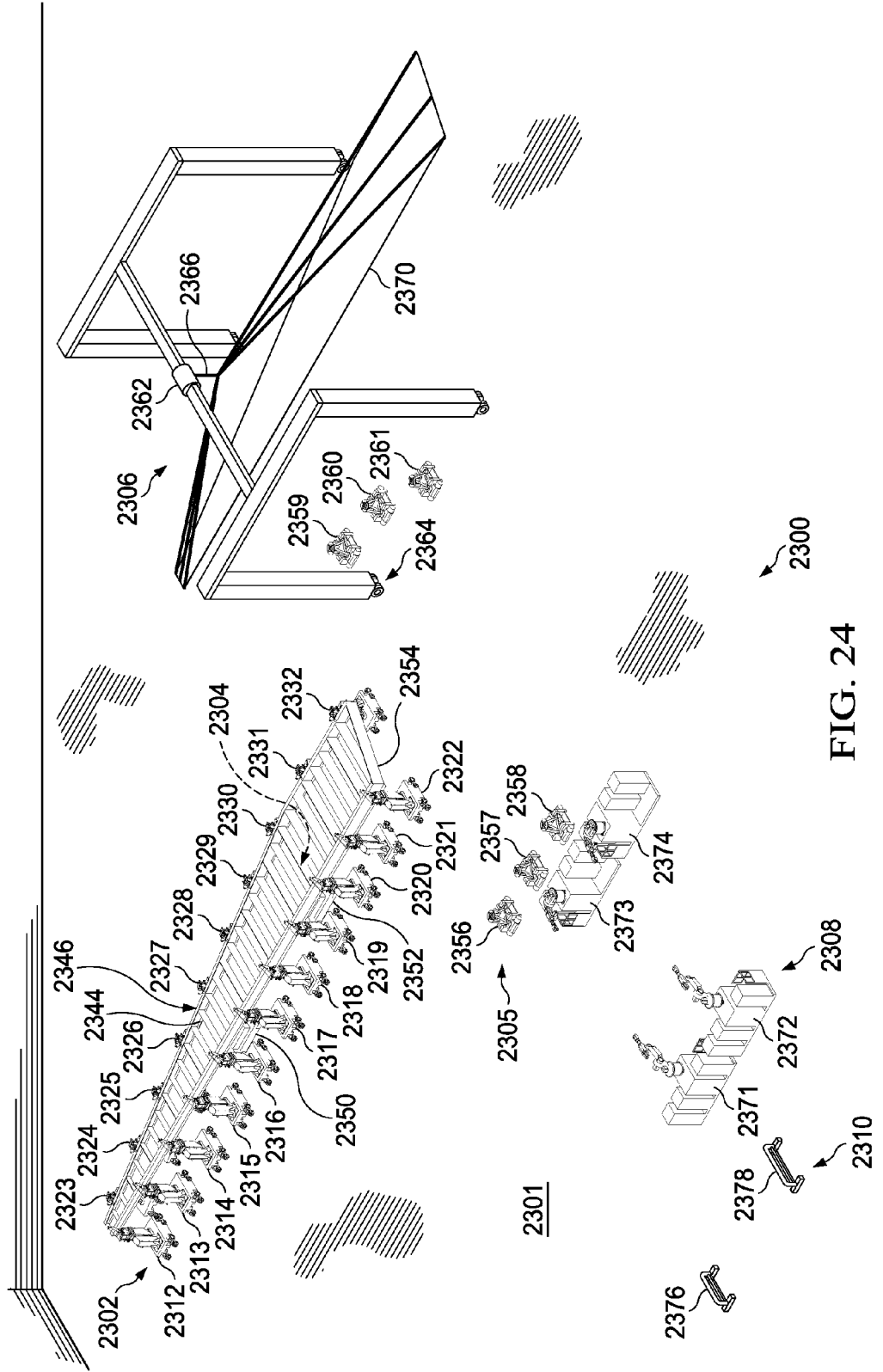
Figure 25:
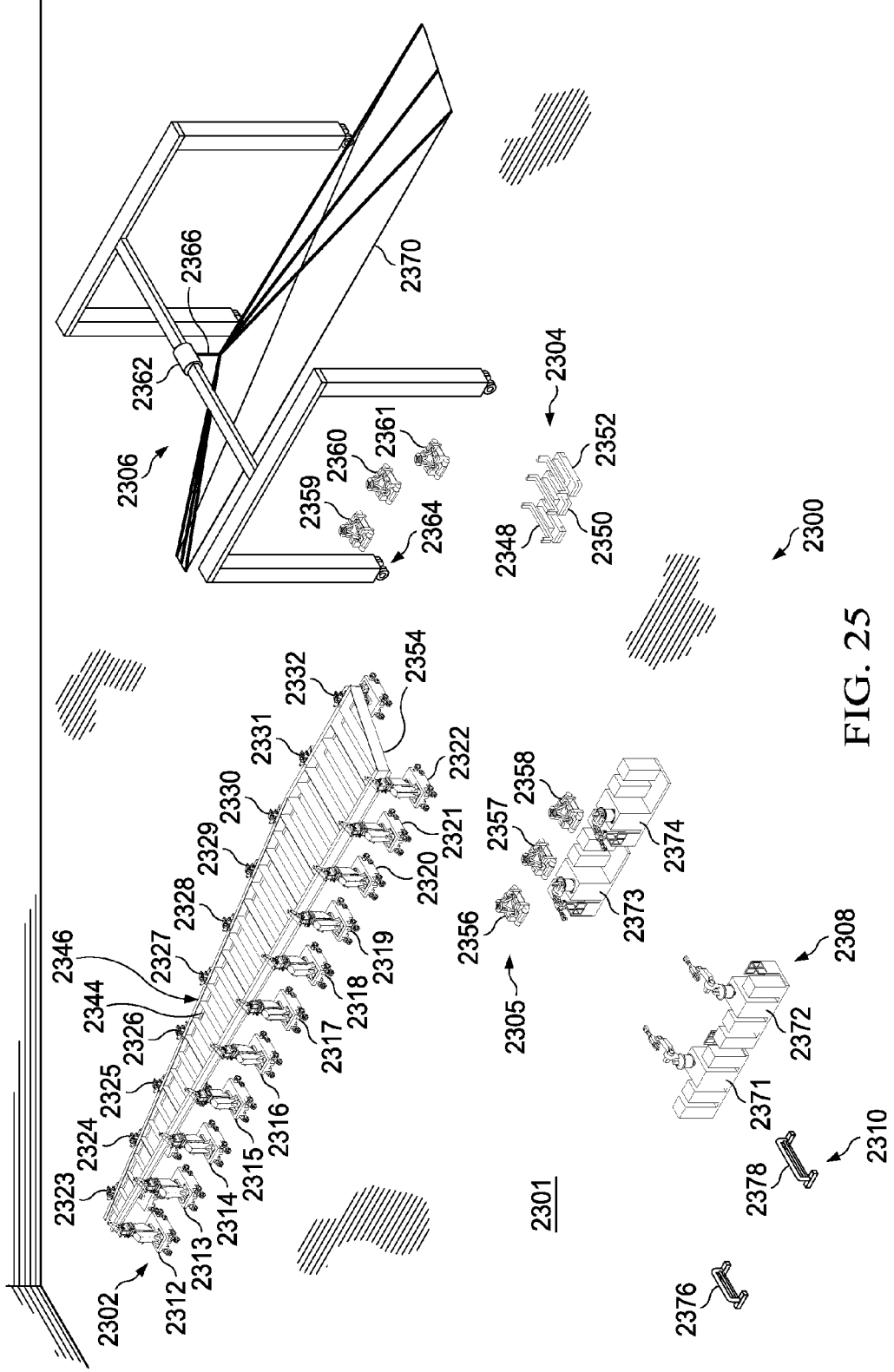

With reference now to FIG. 24, first group of tools 2304 may be moved towards plurality of mobile fixtures 2302 and positioned under wing box 2344 such that skin panel 2354 may be moved to a desired position under wing box 2344 for wing 2346. One or more operators (not shown), human and/or robotic, may be used to temporarily attach skin panel 2354 to wing box 2344. In FIG. 25, first group of tools 2304 may be moved away from plurality of mobile fixtures 2302 after skin panel 2354 has been attached to wing box 2344 for wing 2346.

Figure 26:
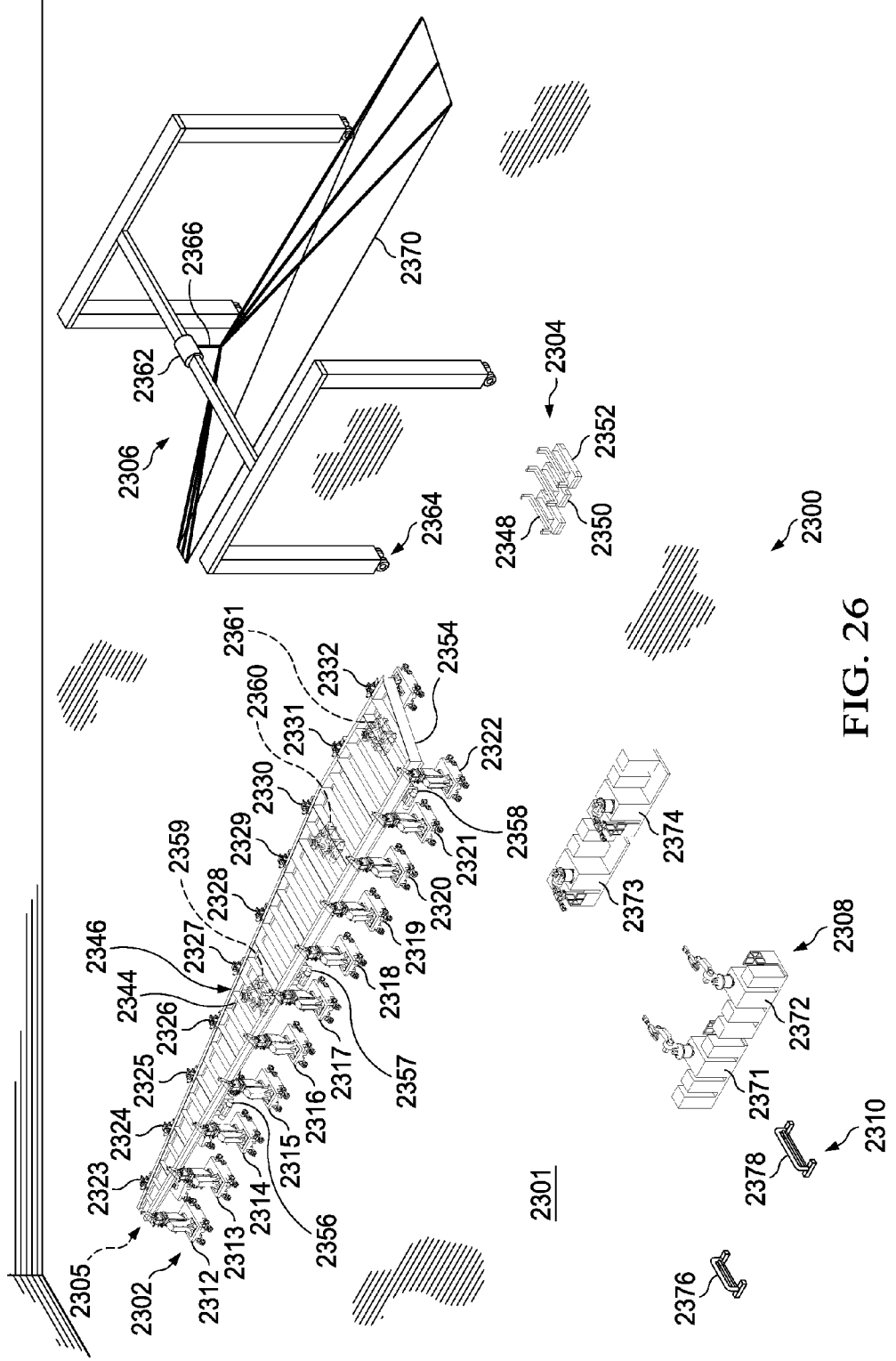

With reference now to FIG. 26, second group of tools 2305 may be moved towards plurality of mobile fixtures 2302 and positioned under skin panel 2354 and wing box 2344 such that additional assembly operations may be performed. In particular, second group of tools 2305 may perform drilling and fastening operations to permanently attach skin panel 2354 to wing box 2344.

Figure 27:
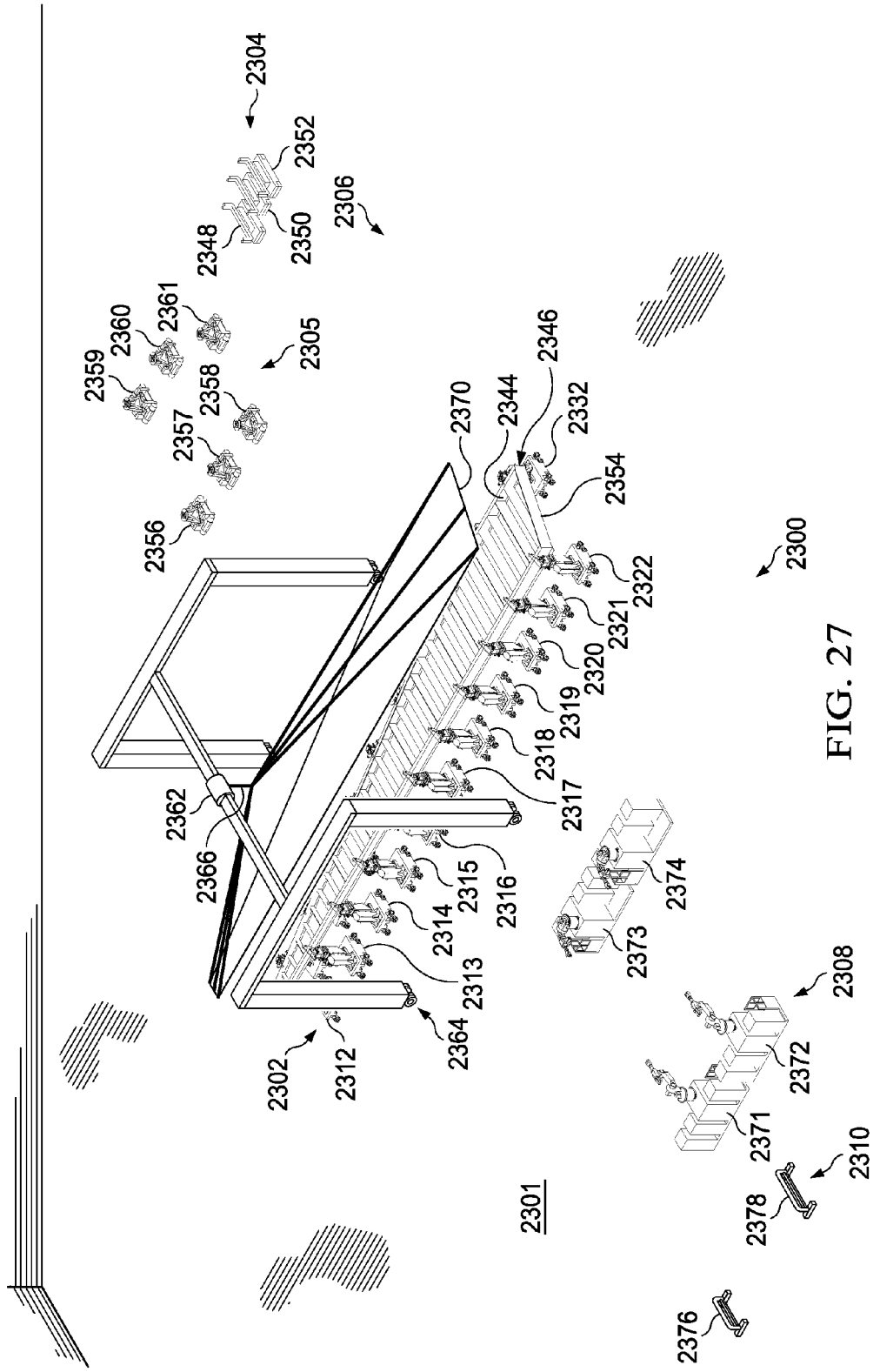

Turning now to FIG. 27, crane system 2306 and plurality of mobile fixtures 2302 supporting wing box 2344 with skin panel 2354 attached to wing box 2344 may move to preselected positions in manufacturing environment 2300 such that skin panel 2370 may be attached to the top of wing box 2344. Plurality of mobile fixtures 2302 may move in a coordinated manner such that a desired orientation of wing box 2344 is substantially maintained while wing box 2344 is transported by plurality of mobile fixtures 2302.

As depicted, plurality of mobile fixtures 2302 may be configured to hold wing box 2344 in an orientation configured to receive skin panel 2370. Crane system 2306 may use cable system 2366 to lower skin panel 2370 onto wing box 2344. Once skin panel 2370 has been lowered onto wing box 2344, a number of operators (not shown), human and/or robotic, may perform operations to temporarily attach skin panel 2370 to wing box 2344.

Figure 28:
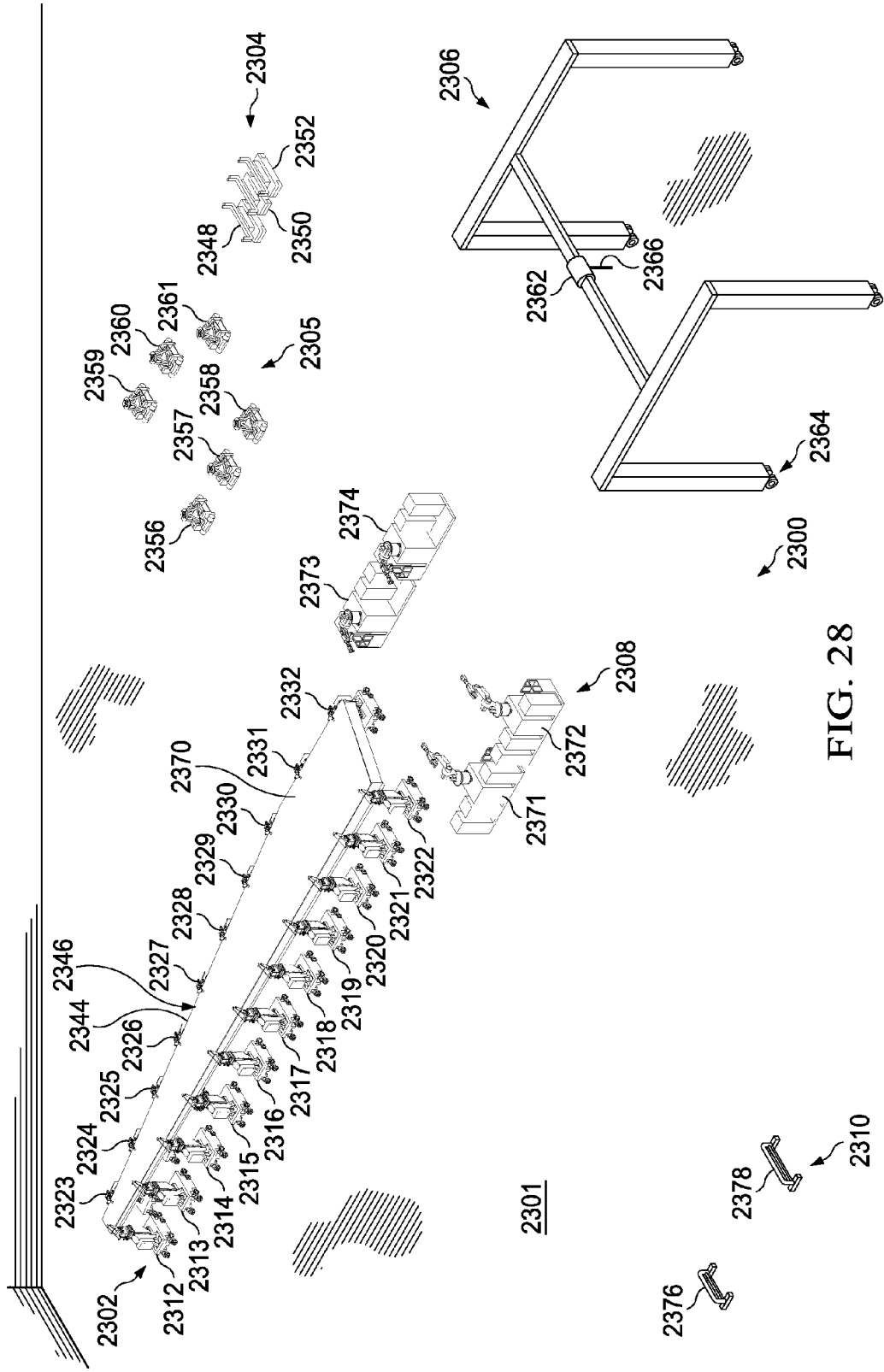

With reference now to FIG. 28, crane system 2306 and plurality of mobile fixtures 2302 carrying wing box 2344 with skin panel 2354 and skin panel 2370 attached to wing box 2344 may be moved away from each other. In this manner, other tools, such as third group of tools 2308, may be configured to move towards wing 2346.

Figure 29:
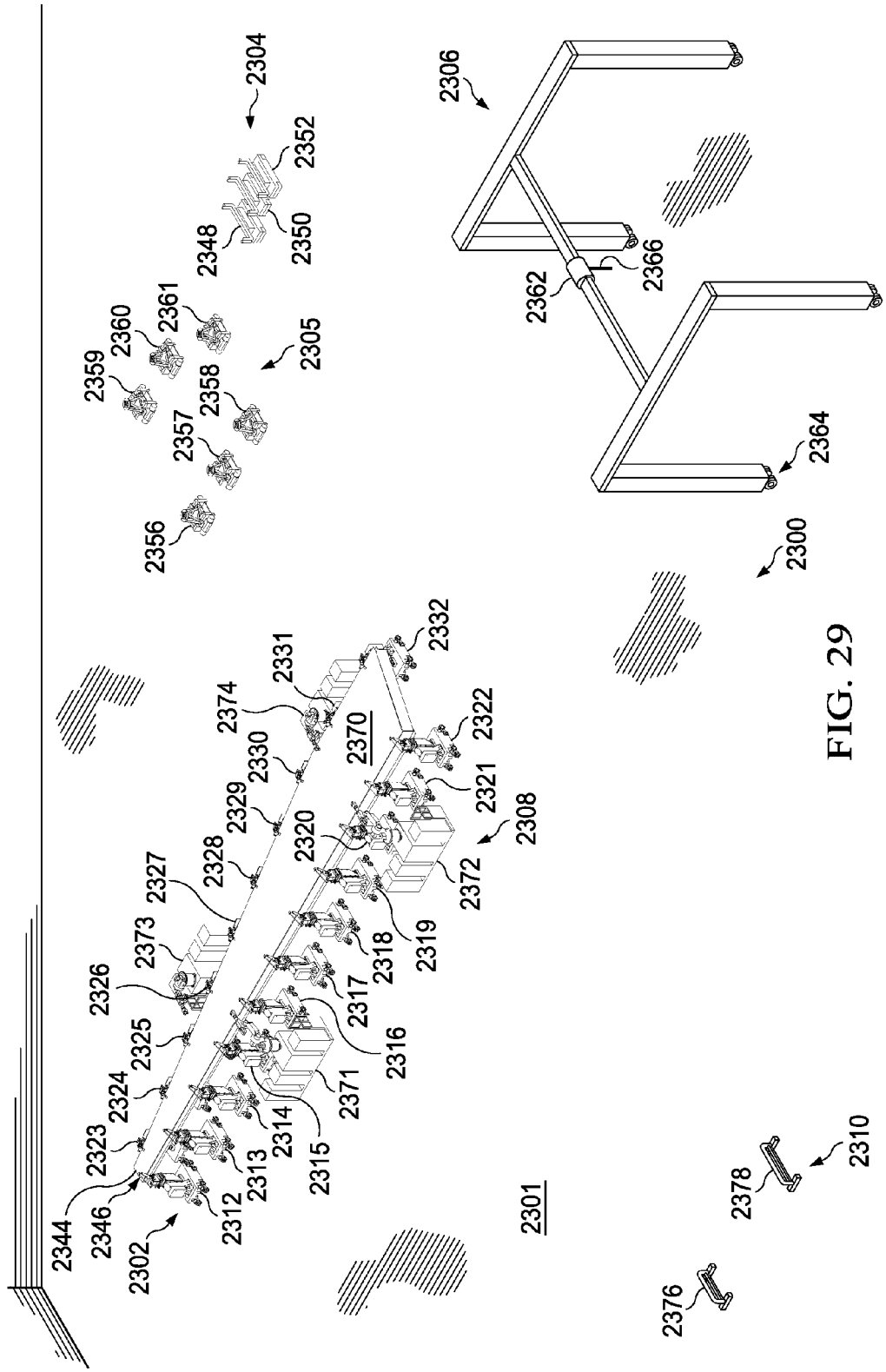

In FIG. 29, third group of tools 2308 may be moved towards plurality of mobile fixtures 2302 and positioned such that third group of tools 2308 may perform additional assembly operations for wing 2346. In particular, third group of tools 2308 may perform drilling and fastening operations to permanently attach skin panel 2370 to the top of wing box 2344 to form fully assembled wing 2346.

Figure 30:
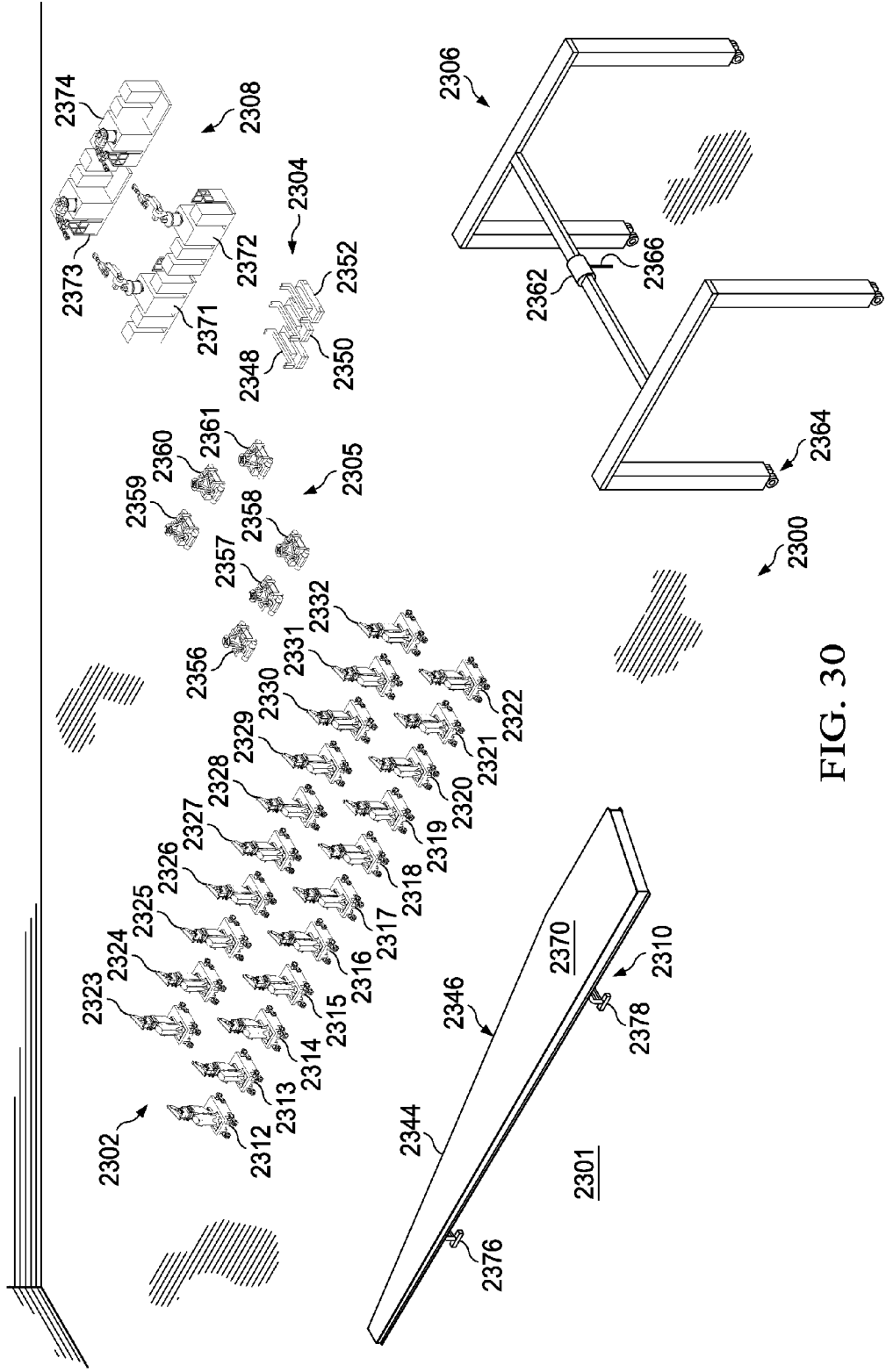

With reference now to FIG. 30, wing 2346 may be fully assembled. As depicted, fourth group of tools 2310 may be moved under wing 2346. Fourth group of tools 2310 may support wing 2346 in a desired orientation for use. Further, plurality of mobile fixtures 2302 may move away from wing 2346. In some cases, plurality of mobile fixtures 2302 may move towards another wing box (not shown) to begin assembly of another wing (not shown).

In this manner, plurality of mobile fixtures 2302 and the different tools, first group of tools 2304, second group of tools 2305, crane system 2306, third group of tools 2308, and fourth group of tools 2310, may be moved around surface 2301 to different positions within manufacturing environment 2300 to perform assembly of wing 2346. Further, plurality of mobile fixtures 2302 may be configured to control the orientation of wing box 2344 and the fully assembled wing 2346 to substantially maintain a number of desired orientations for wing box 2344 and wing 2346 during the process of assembling wing 2346. Plurality of mobile fixtures 2302 may also substantially maintain a desired orientation for wing 2346 while transporting wing box 2344 and wing 2346 within manufacturing environment 2300.

The illustrations of manufacturing environment 2300 in FIGS. 23-30 are not meant to imply physical or architectural limitations to the manner in which the different illustrative embodiments may be implemented. For example, without limitation, in other illustrative examples, first group of tools 2304, second group of tools 2305, crane system 2306, third group of tools 2308, and fourth group of tools 2310 each may be configured to be positioned at corresponding stations within manufacturing environment 2300. These stations may form, for example, without limitation, an assembly line.

Plurality of mobile fixtures 2302 may be configured to transport wing box 2344 for wing 2346 to each of these different stations along this assembly line while simultaneously supporting wing box 2344 in a desired orientation. In some cases, plurality of mobile fixtures 2302 may change the orientation of wing box 2344 to a desired orientation selected for each station along the assembly line. In this manner, plurality of mobile fixtures 2302 may perform both support and transportation functions during the manufacturing of wing 2346.

Figure 31:
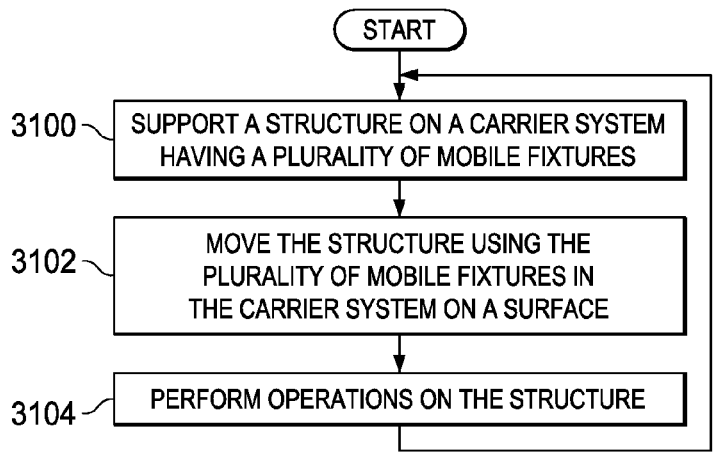
FIG. 31 is an illustration of a process for moving a structure in the form of a flowchart in accordance with an illustrative embodiment.

Turning next to FIG. 31, an illustration of a process for moving a structure is depicted in the form of a flowchart in accordance with an illustrative embodiment. In this illustrative example, the operations in FIG. 31 may be implemented in manufacturing environment 300 in FIG. 3. In particular, the process may be implemented using carrier system 306 having plurality of mobile fixtures 308.

The process may begin by supporting structure 304 on carrier system 306 having plurality of mobile fixtures 308 (operation 3100). The process may then move structure 304 using plurality of mobile fixtures 308 in carrier system 306 on surface 312 (operation 3102). The movement of plurality of mobile fixtures 308 may be in a coordinated manner. Plurality of mobile fixtures 308 may be considered to move in a coordinated manner when plurality of mobile fixtures 308 moves as a group to move structure 304 in a desired direction. In other words, mobile fixtures in plurality of mobile fixtures 308 may be controlled or may communicate with each other to move structure 304. The process may perform operations on structure 304 (operation 3104), with the process then returning to operation 3100.

Operation 3102 and operation 3104 may be performed one after another or at the same time. For example, plurality of mobile fixtures 308 may move structure 304 to a station at which tools 316 may be located. Then, the operations may be performed on structure 304. In another illustrative example, plurality of mobile fixtures 308 may move structure 304 along path 314. Tools 316 may be located along path 314 and may perform operations on structure 304 as structure 304 moves on path 314.

Thus, one or more illustrative embodiments may be used to move structures in a manufacturing facility. In the illustrative examples, carrier system 306 with plurality of mobile fixtures 308 may be used to move structure 304 to different tools in tools 316 within manufacturing environment 300. This movement may occur without requiring time to lift structure 304 from one fixture to another fixture, from one fixture to a platform, from a platform to a fixture, or some other type of movement which may take more time than desired.

Further, with carrier system 306, structure 304 may be moved along path 314 in which tools 316 may be located such that operations may be performed on structure 304 while structure 304 moves along path 314. Further, plurality of mobile fixtures 308 may allow for closer spacing of tools 316 relative to structure 304 and may not interfere with tools 316 during movement of structure 304. As a result, with carrier system 306 using plurality of mobile fixtures 308, floor space in manufacturing environment 300 may be reduced. Also, production time for manufacturing structures, such as structure 304, also may be reduced.

Further, the configuration of manufacturing environment 300 may be made more easily with the use of carrier system 306. Also, a reduction in tools may be achieved using plurality of mobile fixtures 308 in carrier system 306. For example, without limitation, cranes and other lifting mechanisms may be reduced or avoided. As a result, the time needed to manufacture platforms, such as aircraft, may be reduced.

Figure 32:
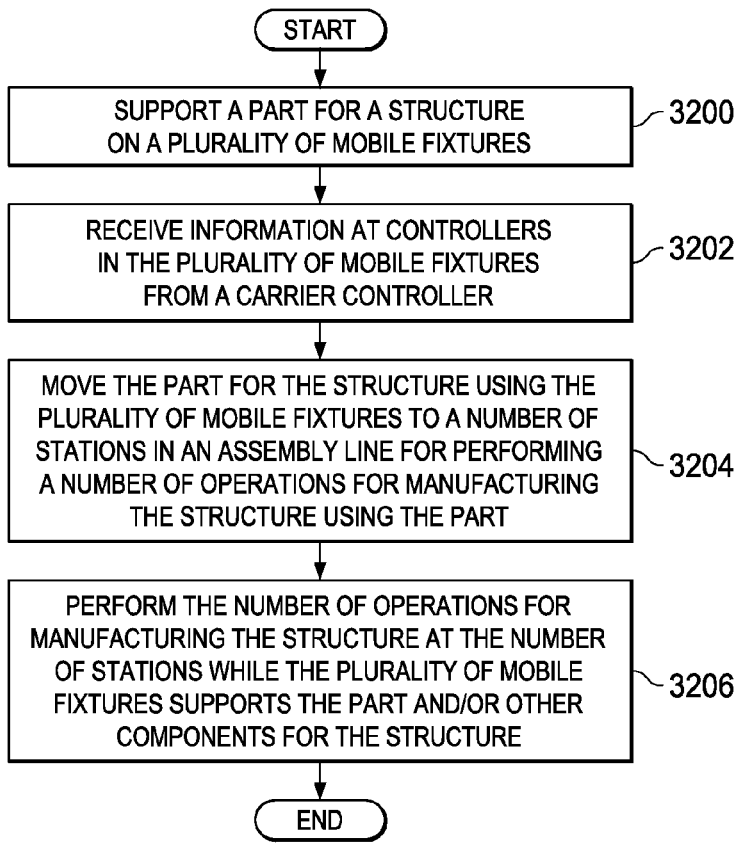
FIG. 32 is an illustration of a process for manufacturing a structure in the form of a flowchart in accordance with an illustrative embodiment.

With reference now to FIG. 32, an illustration of a process for manufacturing a structure is depicted in the form of a flowchart in accordance with an illustrative embodiment. The process illustrated in FIG. 32 may be implemented to manufacture structure 304 using carrier system 306 in FIG. 3. In particular, this process may be implemented using plurality of mobile fixtures 308 in FIG. 3.

The process may begin by supporting part 305 for structure 304 on plurality of mobile fixtures 308 (operation 3200). In operation 3200, plurality of mobile fixtures 308 may be configured to control orientation 311 of part 305.

The process may then receive information at controllers in plurality of mobile fixtures 308 from carrier controller 332 (operation 3202). Carrier controller 332 may be in communication with the controllers in plurality of mobile fixtures 308. Carrier controller 332 may be configured to control movement of plurality of mobile fixtures 308 in a coordinated manner.

In other words, the controllers in plurality of mobile fixtures 308 may use the information received from carrier controller 332 to control movement of plurality of mobile fixtures 308. Further, in some cases, this information may also be used to control orientation 311 of part 305 being supported by plurality of mobile fixtures 308.

The process may then move part 305 for structure 304 using plurality of mobile fixtures 308 to a number of stations in assembly line 371 for performing a number of operations for manufacturing structure 304 using part 305 (operation 3204). In operation 3204, plurality of mobile fixtures 308 may be configured to move in a coordinated manner using the information received from carrier controller 332 in operation 3202. Further, plurality of mobile fixtures 308 may substantially maintain desired orientation 310 for part 305 while moving part 305 to a station in the number of stations in operation 3204.

The process may perform the number of operations for manufacturing the structure at the number of stations while plurality of mobile fixtures 308 supports part 305 and/or other components for structure 304 (operation 3206), with the process terminating thereafter. Operation 3206 may be performed to fully manufacture structure 304.

With reference now to FIG. 33, an illustration of a process for manufacturing a structure is depicted in the form of a flowchart in accordance with an illustrative embodiment. The process illustrated in FIG. 33 may be implemented to manufacture structure 304 using carrier system 306 in manufacturing environment 300 in FIG. 3. In particular, this process may be implemented using plurality of mobile fixtures 308 in FIG. 3.

The process may begin by receiving information for controlling movement of plurality of mobile fixtures 308 from carrier controller 332 (operation 3300). This information may include locations for a number of stations in assembly line 371 for manufacturing structure 304. Structure 304 may be manufactured using part 305. In this illustrative example, structure 304 may be a wing and part 305 may be a wing box for the wing. The information received from carrier controller 332 may also include a number of desired orientations for part 305 for structure 304 for the different stations in assembly line 371.

The process may place part 305 for structure 304 on plurality of mobile fixtures 308 (operation 3302). Thereafter, plurality of mobile fixtures 308 may control orientation 311 of part 305 (operation 3304). Operation 3304 may be performed using the information received from carrier controller 332 in operation 3300. Plurality of mobile fixtures 308 may support part 305 and control orientation 311 of part 305 such that part 305 has desired orientation 310 corresponding to a first station in assembly line 371.

Plurality of mobile fixtures 308 may then move part 305 to the first station in assembly line 371 while substantially maintaining desired orientation 310 for part 305 (operation 3306). Operation 3306 may be performed using the information received from carrier controller 332 in operation 3300.

Next, the process may perform a number of operations for manufacturing structure 304 at the current station in assembly line 371 while plurality of mobile fixtures 308 supports part 305 (operation 3308). Operation 3308 may be performed using at least one of a number of human operators, a number of robotic operators, and a group of tools. This number of operations may include, for example, without limitation, attaching a second part to part 305.

For example, without limitation, when part 305 is a wing box, the number of operations may include attaching a skin panel to part 305 to form a partially assembled wing or a fully assembled wing. This partially assembled wing may be supported by plurality of mobile fixtures 308. In some cases, the number of operations may include fastening and/or drilling operations.

In operation 3308, any number of groups of tools may be used to perform the set of operations. For example, without limitation, a first group of tools present at the station may be used to form one or more of the set of operations. This first group of tools may be fixed at the station. A second group of tools configured to move within manufacturing environment 300 may be moved to the station to perform one or more of the set of operations. This second group of tools may be mobile and/or automated, depending on the implementation.

The process may then determine whether any additional stations are present in assembly line 371 (operation 3310). If additional stations are not present in assembly line 371, the process may terminate. Otherwise, if any additional stations are present in assembly line 371, plurality of mobile fixtures 308 may control orientation 311 of part 305 such that part 305 has desired orientation 310 corresponding to a next station in assembly line 371 (operation 3312).

Operation 3312 may be performed by rotating part 305 about at least one of an x-axis, a y-axis, and a z-axis using at least one of plurality of mobile fixtures 308. Further, changing orientation 311 of part 305 may also include moving a portion of part 305 in the direction of at least one of the x-axis, the y-axis, and the z-axis. Changing orientation 311 of part 305 may include changing the orientation of any additional parts or components attached or fastened to part 305 during operation 3308.

Thereafter, plurality of mobile fixtures 308 may move part 305 to the next station in assembly line 371 while substantially maintaining desired orientation 310 for part 305 (operation 3314). In operation 3314, part 305 along with any additional parts attached or fastened to part 305 during operation 3308 may be moved to the next station. Thereafter, the process may return to operation 3308 as described above.

With the process described in FIG. 33, plurality of mobile fixtures 308 may be used to both support part 305 for structure 304 during manufacturing of structure 304 and transport part 305 to different stations in assembly line 371. This type of process may reduce the time and/or effort needed to manufacture a structure, such as a wing, as compared to currently available methods.

The flowcharts and block diagrams in the different depicted embodiments illustrate the architecture, functionality, and operation of some possible implementations of apparatuses and methods in an illustrative embodiment. In this regard, each block in the flowchart or block diagrams may represent a module, segment, function, and/or a portion of an operation or step. For example, one or more of the blocks may be implemented as program code, in hardware, or a combination of the program code and hardware. When implemented in hardware, the hardware may, for example, without limitation, take the form of integrated circuits that are manufactured or configured to perform one or more operations in the flowchart or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. Many modifications and variations may be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for manufacturing a structure, the method comprising:

supporting a first part for the structure on a plurality of mobile fixtures configured to control an orientation of the first part;

moving the first part for the structure using the plurality of mobile fixtures to a number of stations for performing a number of operations for manufacturing the structure using the first part in which the plurality of mobile fixtures is configured to move in a coordinated manner and substantially maintain a desired orientation for the first part for a next station of the number of stations while moving the first part to the next station in the number of stations; and performing the number of operations for manufacturing the structure at the number of stations while the plurality of mobile fixtures supports the first part;

wherein each mobile fixture comprises a motorized base, wherein the motorized base comprises a movement system, and wherein the movement system comprises magnetic tracks configured to move;

wherein the magnetic tracks are configured to attract a steel plate on a surface of a floor of a manufacturing environment to manufacture the structure;

changing the orientation of the first part at the next station in the number of stations using at least one of the plurality of mobile fixtures;

wherein the step of changing the orientation of the first part at the next station in the number of stations using the at least one of the plurality of mobile fixtures comprises:
rotating the first part about at least one of an x-axis, a y-axis, and a z-axis using the at least one of the plurality of mobile fixtures to change the orientation of the first part; and
coordinating the movement and height adjustment of the fixtures to maintain the first part in a preselected orientation during a manufacturing step and while moving the first part from one position to another along the floor to prevent changes to an orientation of the structure beyond a desired amount that would bring one or more features of the structure out of tolerance and that would affect one or more of performance and maintenance of the structure.

2. The method of claim 1, wherein the step of moving the first part for the structure using the plurality of mobile fixtures comprises:
moving the first part for the structure using the plurality of mobile fixtures to the next station in the number of stations, wherein the next station is part of an assembly line and wherein a group of tools is configured to perform at least one of the number of operations for manufacturing the structure at the next station.

3. The method of claim 2, wherein the step of performing the number of operations for manufacturing the structure at the number of stations comprises:
performing the at least one of the number of operations for manufacturing the structure at the next station in the assembly line using the group of tools while the plurality of mobile fixtures supports the first part.

4. The method of claim 1 further comprising:
moving a group of tools to the next station in the number of stations to perform at least one of the number of operations for manufacturing the structure while the plurality of mobile fixtures supports the first part.

5. The method of claim 1 further comprising:
moving a portion of the plurality of mobile fixtures to move a portion of the first part in a direction along at least one of an x-axis, a y-axis, and a z-axis.

6. The method of claim 1 further comprising:
receiving information at controllers in the plurality of mobile fixtures from a carrier controller in communication with the controllers in which the carrier controller is configured to control movement of the plurality of mobile fixtures in the coordinated manner.

7. The method of claim 1, wherein the step of moving the first part for the structure using the plurality of mobile fixtures to the number of stations for performing the number of operations for manufacturing the structure using the first part comprises:
moving the first part for the structure using the plurality of mobile fixtures to a first station in the number of stations while the plurality of mobile fixtures substantially maintains a first desired orientation for the first part, wherein a group of tools is configured to perform at least one of the number of operations for manufacturing the structure at the first station.

8. The method of claim 7, wherein the step of performing the number of operations for manufacturing the structure at the number of stations while the plurality of mobile fixtures supports the first part comprises:
attaching a second part to the first part at the first station to form a partially assembled structure using the group of tools.

9. The method of claim 8, wherein the step of moving the first part for the structure using the plurality of mobile fixtures to the number of stations for performing the number of operations for manufacturing the structure using the first part further comprises:
changing the first desired orientation of the first part with the partially assembled structure to a second desired orientation using the plurality of mobile fixtures; and
moving the first part with the partially assembled structure using the plurality of mobile fixtures to a second station in the number of stations while the plurality of mobile fixtures substantially maintains the second desired orientation for the first part with the partially assembled structure.

10. The method of claim 1, wherein the step of performing the number of operations for manufacturing the structure at the number of stations while the plurality of mobile fixtures supports the first part comprises:
performing at least one of the number of operations for manufacturing the structure using a number of operators at the next station in the number of stations while the plurality of mobile fixtures supports the first part, wherein the number of operators includes at least one of a human operator and a robotic operator.

11. The method of claim 1, wherein the first part is a wing box, a second part is a skin panel, the structure is a wing, and at least one of the number of operations includes attaching the skin panel to the wing box.

12. The method of claim 1, wherein the first part is selected from one of a frame for the structure, a housing for the structure, a number of components previously assembled for the structure, a wing box, and the structure.

13. An apparatus comprising:
a number of stations for performing a number of operations for manufacturing a structure; and
a plurality of mobile fixtures configured to support a first part for the structure, control an orientation of the first part for a next station of the number of stations, and move the first part to the next station in the number of stations while substantially maintaining a desired orientation for the first part in which the plurality of mobile fixtures is configured to move in a coordinated manner;
wherein each mobile fixture comprises a motorized base, wherein the motorized base comprises a movement system, and wherein the movement system comprises magnetic tracks configured to move;
wherein the magnetic tracks are configured to attract a steel plate on a surface of a floor of a manufacturing environment to manufacture the structure;
wherein the orientation of the first part is changed at the next station in the number of stations using at least one of the plurality of mobile fixtures;
wherein the step of changing the orientation of the first part at the next station in the number of stations using the at least one of the plurality of mobile fixtures comprises:
rotating the first part about at least one of an x-axis, a y-axis, and a z-axis using the at least one of the plurality of mobile fixtures to change the orientation of the first part;
wherein the movement and height adjustment of the fixtures is coordinated to maintain the first part in a preselected orientation during a manufacturing step and while moving the first part from one position to another along the floor to prevent changes to an orientation of the structure beyond a desired amount that would bring one or more features of the structure out of tolerance and that would affect one or more of performance and maintenance of the structure.

14. The apparatus of claim 13, wherein the number of stations is part of an assembly line for manufacturing the structure.

15. The apparatus of claim 13 further comprising:
a group of tools configured to perform at least one of the number of operations for manufacturing the structure at the next station in the number of stations while the plurality of mobile fixtures supports the first part.

16. The apparatus of claim 13 further comprising:
a surface, wherein the plurality of mobile fixtures is configured to move on the surface to move the first part to the next station in the number of stations.

17. The apparatus of claim 13 further comprising:
a number of operators configured to perform at least one of the number of operations for manufacturing the structure using the first part, wherein the number of operators includes at least one of a human operator and a robotic operator.

18. The apparatus of claim 15, wherein the group of tools is moved to the next station in the number of stations to perform the at least one of the number of operations for manufacturing the structure while the plurality of mobile fixtures supports the first part.

19. The apparatus of claim 13, wherein the plurality of mobile fixtures is configured to move in the coordinated manner to change the orientation of the first part at the next station in the number of stations.

20. The apparatus of claim 19, wherein the plurality of mobile fixtures is configured to rotate the first part about at least one of an x-axis, a y-axis, and a z-axis to change the orientation of the first part.

21. The apparatus of claim 13, wherein a portion of the plurality of mobile fixtures is configured to move a portion of the first part in a direction along at least one of an x-axis, a y-axis, and a z-axis.

22. The apparatus of claim 13 further comprising:
a carrier controller configured to communicate with controllers in the plurality of mobile fixtures and control movement of the plurality of mobile fixtures.

23. The apparatus of claim 22, wherein the carrier controller is configured to control support systems in the plurality of mobile fixtures to substantially maintain the desired orientation for the first part.

24. The apparatus of claim 13, wherein a mobile fixture in the plurality of mobile fixtures comprises:
a motorized base configured to move on a surface;
a support system associated with the motorized base in which the support system is configured to be positioned to support a portion of the first part; and
a controller associated with the motorized base in which the controller is configured to control movement of the motorized base.

25. The apparatus of claim 13, wherein the first part is selected from one of a frame for the structure, a housing for the structure, a number of components previously assembled for the structure, a wing box, and the structure and wherein the structure is selected from one of an aerospace structure, a wing, a fuselage, a horizontal stabilizer, a vertical stabilizer, a flight control surface, and an engine.

26. A method for manufacturing a structure for an aerospace vehicle, the method comprising:
supporting a first part for the structure on a plurality of mobile fixtures configured to control an orientation of the first part with respect to an x-axis, a y-axis, and a z-axis;
receiving information at controllers in the plurality of mobile fixtures from a carrier controller in communication with the controllers in which the carrier controller is configured to control movement of the plurality of mobile fixtures in a coordinated manner;
moving the first part for the structure using the plurality of mobile fixtures to a number of stations for performing a number of operations for manufacturing the structure using the first part in which the plurality of mobile fixtures is configured to move and substantially maintain a desired orientation for the first part for a next station of the number of stations while moving the first part to the next station in the number of stations and in which the number of stations is part of an assembly line for manufacturing the structure; and
performing at least one of the number of operations for manufacturing the structure at the station in the number of stations using a group of tools while the plurality of mobile fixtures supports the first part;
wherein each mobile fixture comprises a motorized base, wherein the motorized base comprises a movement system, and wherein the movement system comprises magnetic tracks configured to move;
wherein the magnetic tracks are configured to attract a steel plate on a surface of a floor of a manufacturing environment to manufacture the structure;
changing the orientation of the first part at the next station in the number of stations using at least one of the plurality of mobile fixtures;
wherein the step of changing the orientation of the first part at the next station in the number of stations using the at least one of the plurality of mobile fixtures comprises:
rotating the first part about at least one of an x-axis, a y-axis, and a z-axis using the at least one of the plurality of mobile fixtures to change the orientation of the first part; and
coordinating the movement and height adjustment of the fixtures to maintain the first part in a preselected orientation during a manufacturing step and while moving the first part from one position to another along the floor to prevent changes to an orientation of the structure beyond a desired amount that would bring one or more features of the structure out of tolerance and that would affect one or more of performance and maintenance of the structure.

27. A system comprising:
a carrier system for an aircraft structure, the carrier system comprising:
a plurality of mobile fixtures configured to hold and move the aircraft structure, in which a mobile fixture in the plurality of mobile fixtures comprises: (a) a motorized base configured to move on a surface; (b) a support system associated with the motorized base and configured to be positioned to support a portion of a structure in which the support system comprises a post extending from the motorized base; a connector system configured to be connected to the structure; a member movably connected to the post and connected to the connector system and configured to move the connector system relative to the motorized base and change a height of the connector system relative to the motorized base; (c) a controller associated with the motorized base and configured to control movement of the motorized base and the plurality of mobile fixtures on the surface; and (d) a movement system configured to move the member relative to the connector system in which the connector system comprises a connector configured to be connected to the portion of the structure and a positioning system configured to position the connector about a number of axes, in which the motorized base has a housing and the movement system in which the movement system comprises magnetic tracks and a motor configured to move the magnetic tracks;

wherein the magnetic tracks are configured to attract a steel plate on a surface of a floor of a manufacturing environment to manufacture the structure; and a carrier controller configured to communicate with controllers in the plurality of mobile fixtures and control movement of the plurality of mobile fixtures in which the carrier controller is configured to control the plurality of mobile fixtures to maintain the structure in a desired orientation for a next station of a number of stations while moving the structure to the next station in a number of stations;

wherein the orientation of the structure is changed at the next station in the number of stations using at least one of the plurality of mobile fixtures;

wherein the step of changing the orientation of the structure at the next station in the number of stations using the at least one of the plurality of mobile fixtures comprises:

rotating the structure about at least one of an x-axis, a y-axis, and a z-axis using the at least one of the plurality of mobile fixtures to change the orientation of the structure;

wherein the movement and height adjustment of the fixtures is coordinated to maintain the structure in a preselected orientation during a manufacturing step and while moving the structure from one position to another along the floor to prevent changes to an orientation of the structure beyond a desired amount that would bring one or more features of the structure out of tolerance and that would affect one or more of performance and maintenance of the structure.

28. The method of claim 1, further comprising:

controlling the orientation of the first part to have the desired orientation corresponding to the next station of the number of stations after performing the number of operations at a current station of the number of stations; and moving the first part to the next station while maintaining the desired orientation corresponding to the next station;

wherein members of the mobile fixtures are adjusted to take into account variations that may occur in a floor of a manufacturing environment to manufacture the structure to maintain the desired orientation for the structure; and wherein the structure is a wing.

29. A method for manufacturing a structure, the method comprising:

supporting a first part for the structure in a preselected orientation with a plurality of mobile fixtures, each fixture being movable along a factory floor and adjustable in height;

coordinating the movement and height adjustment of the fixtures to maintain the first part in the preselected orientation during a manufacturing step and while moving the first part from one position to another along the factory floor to prevent changes to an orientation of the structure beyond a desired amount that would bring one or more features of the structure out of tolerance and that would affect one or more of performance and maintenance of the structure; and changing the orientation of the first part at a next station in a number of stations using at least one of the plurality of mobile fixtures;

wherein the step of changing the orientation of the first part at the next station in the number of stations using the at least one of the plurality of mobile fixtures comprises:

rotating the first part about at least one of an x-axis, a y-axis, and a z-axis using the at least one of the plurality of mobile fixtures to change the orientation of the first part;

wherein each mobile fixture comprises a motorized base, wherein the motorized base comprises a movement system, and wherein the movement system comprises magnetic tracks configured to move; and wherein the magnetic tracks are configured to attract a steel plate on a surface of the factory floor.

30. The method of claim 29, wherein the coordinated movement and height adjustment of the plurality of fixtures is capable of rotating a portion of the first part about any combination of an x-axis, y-axis and z-axis.

31. The method of claim 30, further comprising coordinating the movement and height adjustment of the fixtures so as to reorient the first part to a second preselected orientation during its manufacture.

32. A method for manufacturing a structure, the method comprising:

supporting a first part for the structure on a plurality of mobile fixtures configured to control an orientation of the first part;

performing a number of operations for manufacturing the structure at a number of stations while the plurality of mobile fixtures supports the first part;

maintaining a desired orientation for the first part during manufacture of the structure to manufacture the structure within desired tolerances via the plurality of mobile fixtures that are configured to move in a coordinated manner and substantially maintain a desired orientation for the first part;

wherein each mobile fixture comprises a motorized base, wherein the motorized base comprises a movement system, and wherein the movement system comprises magnetic tracks configured to move;

wherein the magnetic tracks are configured to attract a steel plate on a surface of a floor of a manufacturing environment to manufacture the structure:

changing the orientation of the first part at a next station in the number of stations using at least one of the plurality of mobile fixtures;

wherein the step of changing the orientation of the first part at the next station in the number of stations using the at least one of the plurality of mobile fixtures comprises:

rotating the first part about at least one of an x-axis, a y-axis, and a z-axis using the at least one of the plurality of mobile fixtures to change the orientation of the first part; and coordinating the movement and height adjustment of the fixtures to maintain the first part in a preselected orientation during a manufacturing step and while moving the first part from one position to another along the floor to prevent changes to an orientation of the structure beyond a desired amount that would bring one or more features of the structure out of tolerance and that would affect one or more of performance and maintenance of the structure.

33. The method of claim 1, further comprising:
using a cable system of a crane system to lower a second part onto the first part;
wherein the crane system is configured to be wide and tall enough to allow the plurality of mobile fixtures carrying the first part to pass through and under a frame of the crane system.

* * * * *